(12) United States Patent
Tang

(10) Patent No.: US 11,950,293 B2
(45) Date of Patent: Apr. 2, 2024

(54) RANDOM ACCESS METHOD AND TERMINAL DEVICE, AND NETWORK DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 444 days.

(21) Appl. No.: 17/372,662

(22) Filed: Jul. 12, 2021

(65) Prior Publication Data

US 2021/0345413 A1    Nov. 4, 2021

Related U.S. Application Data

(63) Continuation of application No. PCT/CN2019/072243, filed on Jan. 17, 2019.

(51) Int. Cl.
*H04W 72/512* (2023.01)
*H04W 48/10* (2009.01)
(Continued)

(52) U.S. Cl.
CPC ....... *H04W 74/0833* (2013.01); *H04W 48/10* (2013.01); *H04W 72/53* (2023.01)

(58) Field of Classification Search
None
See application file for complete search history.

(56) References Cited

U.S. PATENT DOCUMENTS 9,025,455 B2   5/2015  Lin
10,111,067 B2  10/2018 Bennett et al.
(Continued)

FOREIGN PATENT DOCUMENTS

CN    103905378 A    7/2014
CN    105637781 A    6/2016
(Continued)

OTHER PUBLICATIONS

First Examination Report of the Indian application No. 202127033769, dated May 17, 2022. 6 pages with English Translation.
(Continued)

*Primary Examiner* — Duc T Duong
(74) *Attorney, Agent, or Firm* — Perkins Coie LLP

(57) ABSTRACT

Disclosed are a random access method and a network device, and a terminal device. The method includes: a terminal device sending first information on a first resource, and sending second information on a second resource; the terminal device detecting third information on one group of third pre-allocated resources in a first window, wherein a start position of the first window comprises: a position after a first time interval after the terminal device sends the second information; or a first time unit after the first time interval after the terminal device sends the second information; or a first time unit in the one group of third pre-allocated resources after the first time interval after the terminal device sends the second information; and the terminal device receiving fourth information on a fourth resource.

20 Claims, 12 Drawing Sheets

(51) Int. Cl.
*H04W 72/53* (2023.01)
*H04W 74/0833* (2024.01)

(56) References Cited

U.S. PATENT DOCUMENTS

| | | | | |
|---|---|---|---|---|
| 10,728,927 | B2* | 7/2020 | Chou | H04W 76/27 |
| 2019/0132882 | A1* | 5/2019 | Li | H04W 74/0833 |
| 2020/0100296 | A1* | 3/2020 | Roy | H04W 72/56 |
| 2020/0154490 | A1* | 5/2020 | Xiang | H04L 5/0053 |
| 2020/0344810 | A1* | 10/2020 | Xiong | H04W 74/0833 |
| 2021/0243814 | A1* | 8/2021 | Zhang | H04W 74/0833 |
| 2021/0307061 | A1* | 9/2021 | Huang | H04W 74/0808 |
| 2021/0345344 | A1* | 11/2021 | Sha | H04W 72/1273 |

FOREIGN PATENT DOCUMENTS

| | | |
|---|---|---|
| CN | 108347318 A | 7/2018 |
| WO | 2018064367 A1 | 4/2018 |
| WO | 2018127042 A1 | 7/2018 |

OTHER PUBLICATIONS

ASUSTeK "Consideration on fallback of 2-step RACH procedure" R2-1700358; 3GPP TSG-RAN WG2 Meeting #NR Ad Hoc; Spokane, USA; Jan. 17-19, 2017. 4 pages.

ASUSTeK et al. "Consideration on use cases of 2-step RACH procedure" R2-1700356; 3GPP TSG-RAN WG2 Meeting #NR Ad Hoc; Spokane, USA, Jan. 17-19, 2017. 4 pages.

Extended European Search Report for European Application No. 19909864.1 dated Dec. 15, 2021. 14 pages.

InterDigital "2-Step RACH Procedure" R2-1814008; 3GPP TSG-RAN WG2 Meeting #103bis; Chengdu, China; Oct. 8-12, 2018. 5 pages.

Nokia et al. "On 2-step Random Access Procedure" R1-1901192; 3GPP TSG RAN WG1 Ad- Hoc Meeting 1901; Taipei, Taiwan; Jan. 21-25, 2019. 7 pages.

International Search Report dated Sep. 30, 2019 of PCT/CN2019/072243 (4 pages).

* cited by examiner

200

| A terminal device sends first information on a first resource and sends second information on a second resource | ⟵ 210 |

| The terminal device detects third information on a group of third pre-configured resources in a first window | ⟵ 220 |

| The terminal device receives fourth information on a fourth resource | ⟵ 230 |

300

A network device detects first information on a group of first pre-configured resources and detects second information on a group of second pre-configured resources — 310

The network device sends third information on a third resource in a first window — 320

The network device sends fourth information on a fourth resource — 330

RANDOM ACCESS METHOD AND TERMINAL DEVICE, AND NETWORK DEVICE

CROSS-REFERENCE TO RELATED APPLICATION

The present application is a continuation application of International PCT Application No. PCT/CN2019/072243, filed on Jan. 17, 2019, the entire content of which is hereby incorporated by reference.

TECHNICAL FIELD

Implementations of the present disclosure relate to the technical field of communication, specifically to a method for random access, a terminal device, and a network device.

BACKGROUND

In a contention-based random access procedure, a four-step access method, namely, access request (Message 1, Msg1), access response (Message 2, Msg2), scheduled transmission (Message 3, Msg3) and conflict resolution (Message 4, Msg4), can usually be adopted.

However, in the current contention-based random access procedure, four independent steps are needed, including information interaction between a terminal device and a network device is performed twice, which brings a large delay overhead. This approach is not applicable to many low-latency scenarios, such as an Ultra-Reliable Low Latency Communication (URLLC) scenario in 5G.

Therefore, it is urgent to provide a method for random access applicable to a low-latency scenario, so as to achieve random access of a terminal device.

SUMMARY

Implementations of the present disclosure provide a method for random access, a terminal device and a network device, which are used for achieving a random access of a terminal device in a low-latency scenario.

In a first aspect, a method for random access is provided, which includes:
  sending, by a terminal device, first information on a first resource and sending second information on a second resource;
  detecting, by the terminal device, third information on a group of third pre-configured resources in a first window; wherein a start position of the first window includes:
  a position after a first time interval after a terminal device sends the second information; or
  a first time unit after the first time interval after the terminal device sends the second information; or
  a first time unit with the third pre-configured resource existing after the first time interval after the terminal device sends the second information; and
  receiving, by the terminal device, fourth information on a fourth resource.

In a second aspect, another method for random access is provided, which includes:
  detecting, by a network device, first information on a group of first pre-configured resources and detecting second information on a group of second pre-configured resources;
  sending, by the network device, third information on a group of third pre-configured resources in a first window, wherein a start position of the first window includes:
  a position after a first time interval after a terminal device sends the second information; or
  a first time unit after the first time interval after the terminal device sends the second information; or
  a first time unit with the third pre-configured resource existing after the first time interval after the terminal device sends the second information; and
  sending, by the network device, fourth information on a fourth resource.

In a third aspect, a terminal device is provided, which is configured to perform the method in the above first aspect or in various implementation modes thereof.

Specifically, the terminal device includes function modules configured to perform the method in the above first aspect or in various implementation modes thereof.

In a fourth aspect, a network device is provided, which is configured to perform the method in the above second aspect or in various implementation modes thereof.

Specifically, the network device includes function modules configured to perform the method in the above second aspect or in various implementation modes thereof.

In a fifth aspect, a communication device is provided, which includes a processor and a memory. The memory is configured to store a computer program, and the processor is configured to call and run the computer program stored in the memory to perform the method in any one of the above first to second aspects or in various implementation modes thereof.

In a sixth aspect, a chip is provided, which is configured to implement the method in any one of the above first to second aspects or in various implementation modes thereof.

Specifically, the chip includes a processor configured to call and run a computer program from a memory, such that a device with the chip installed therein performs the method in any one of the above first to second aspects or in various implementation modes thereof.

In a seventh aspect, a computer-readable storage medium is provided, which is configured to store a computer program, wherein the computer program enables a computer to perform the method in any one of the above first to second aspects or in various implementation modes thereof.

In an eighth aspect, a computer program product is provided, including computer program instructions which enable a computer to perform the method in any one of the above first to second aspects or in various implementation modes thereof.

In a ninth aspect, a computer program is provided, which, when being run on a computer, enables the computer to perform the method in any one of the above first to second aspects or in various implementation modes thereof.

With the above technical solution, on the one hand, in the implementations of the present disclosure, the terminal device sends the first information on the first resource and sends the second information on the second resource, and then the terminal device detects the third information on a group of third pre-configured resources in the first window, so that the terminal device can receive the fourth information on the fourth resource. In this way, in a complete random access procedure, information interaction needs to be performed only once between the terminal device and the network device, which can effectively reduce the delay overhead of the random access, thus the random access of the terminal device in a low-latency scenario is achieved.

With the above technical solution, on the other hand, in the implementations of the present disclosure, the network device detects the first information on a group of first pre-configured resources and detects the second information on a group of second pre-configured resources, so that the network device can send the third information on the third resource and send the fourth information on the fourth resource in the first window. In this way, in a complete random access procedure, information interaction needs to be performed only once between the terminal device and the network device, which can effectively reduce the delay overhead of the random access, thus the random access of the terminal device in a low-latency scenario is achieved.

BRIEF DESCRIPTION OF DRAWINGS

In order to describe technical solutions of implementations of the present disclosure more clearly, the drawings needed to be used in description of the implementations or related art will be simply introduced below. Apparently, the drawings described below are only some implementations of the present disclosure, and one skilled in the art may obtain other drawings according to these drawings without paying an inventive effort.

DETAILED DESCRIPTION

Technical solutions in implementations of the present disclosure will be described below with reference to the drawings in implementations of the present disclosure. It is apparent that the implementations described are just a part of implementations of the present disclosure, but not all implementations of the present disclosure. Base on the implementations of the present disclosure, all other implementations obtained by a person of ordinary skill in the art without paying an inventive effort belong to the protection scope of the present disclosure.

The technical solutions of the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system, or a 5G system.

Figures 1, 2A:
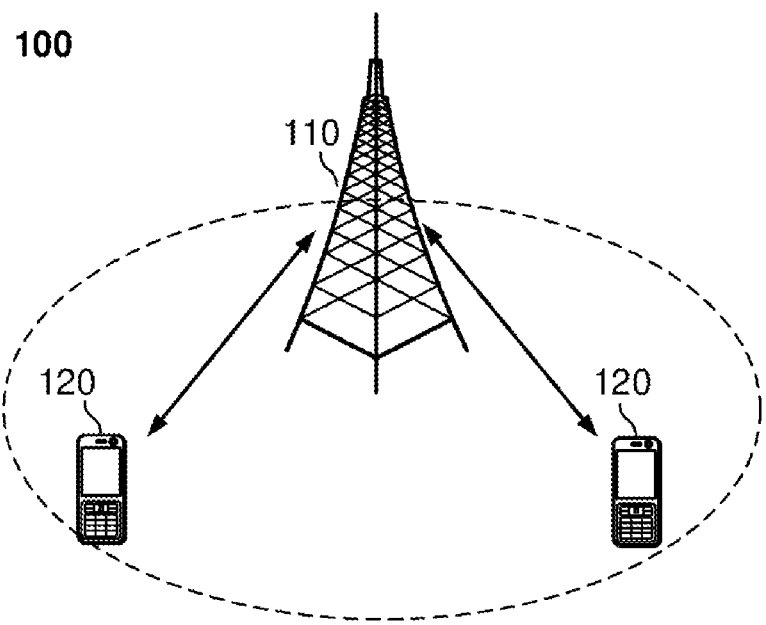
FIG. 1 is a schematic diagram of architecture of a communication system according to an implementation of the present disclosure.
FIG. 2A is a schematic diagram of a method for random access according to an implementation of the present disclosure.

Illustratively, a communication system 100 applied in an implementation of the present disclosure is shown in FIG. 1. The communication system 100 may include a network device 110, wherein the network device 110 may be a device that communicates with a terminal device 120 (or referred to as a communication terminal device, or a terminal device). The network device 110 may provide communication coverage for a specific geographical area, and may communicate with terminal devices located within the coverage area. Optionally, the network device 110 may be a Base Transceiver Station (BTS) in a GSM system or a CDMA system, a NodeB (NB) in a WCDMA system, an Evolutional Node B (eNB or eNodeB) in an LTE system, or a radio controller in a Cloud Radio Access Network (CRAN), or the network device may be a mobile switch center, a relay station, an access point, a vehicle-mounted device, a wearable device, a hub, a switch, a bridge, a router, or a network side device in a 5G network, or a network device in a future evolved Public Land Mobile Network (PLMN), etc.

The communication system 100 also includes at least one terminal device 120 located within the coverage area of the network device 110. As used herein, the term "terminal device" includes, but is not limited to, a device configured to connect via a wired circuit, for example, via Public Switched Telephone Networks (PSTN), a Digital Subscriber Line (DSL), a digital cable, or a direct cable; and/or another data connection/network; and/or via a wireless interface, for example, for a cellular network, a Wireless Local Area Network (WLAN), a digital television network such as a DVB-H network, a satellite network, or an AM-FM broadcast sender; and/or an apparatus, of another terminal device, configured to receive/send a communication signal; and/or an Internet of Things (IoT) device. A terminal device configured to communicate via a wireless interface may be referred to as a "wireless communication terminal device", a "wireless terminal device" or a "mobile terminal device". Examples of the mobile terminal device include, but are not limited to, a satellite or cellular telephone, a Personal Communication System (PCS) terminal device which may be combined with a cellular wireless telephone and data processing, faxing, and data communication capability, a PDA that may include a radio telephone, a pager, an internet/intranet access, a Web browser, a notepad, a calendar, and/or a Global Positioning System (GPS) receiver, and a conventional laptop and/or handheld receiver or another electronic apparatus including a radio telephone transceiver. The terminal device may be referred to as an access terminal device, a User Equipment (UE), a subscriber unit, a subscriber station, a mobile station, a mobile platform, a remote station, a remote terminal device, a mobile device, a user terminal device, a terminal device, a wireless communication device, a user agent or a user apparatus. The access terminal device may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal device in a 5G network, or a terminal device in a future evolved PLMN, or the like.

Optionally, Device to Device (D2D) communication of terminal devices may be performed between the terminal devices 120.

Optionally, the 5G system or the 5G network may also be referred to as a New Radio (NR) system or an NR network.

FIG. 1 shows one network device and two terminal devices as an example. Optionally, the communication system 100 may include multiple network devices, and another quantity of terminal devices may be included within a coverage area of each network device, and this is not limited in the implementations of the present disclosure.

Optionally, the communication system 100 may also include another network entity such as a network controller, a mobile management entity, which is not limited in the implementations of the present disclosure.

It should be understood that, a device with a communication function in a network/system in the implementations of the present disclosure may be referred to as a communication device. Taking the communication system 100 shown in FIG. 1 as an example, the communication device may include a network device 110 and a terminal device 120 which have communication functions, and the network device 110 and the terminal device 120 may be the specific devices described above, which will not be repeated here again; and the communication device may also include another device in the communication system 100, for example, another network entity such as a network controller, a mobile management entity, which is not limited in the implementations of the present disclosure.

It should be understood that the terms "system" and "network" herein are often used interchangeably in this document. The term "and/or" in this document is merely an association relationship describing associated objects, indicating that there may be three relationships, for example, A and/or B may indicate three cases: A alone, both of A and B, and B alone. In addition, the symbol "I" in this document generally indicates that objects before and after the symbol "/" have an "or" relationship.

FIG. 2A is a schematic diagram of a method for random access 200 according to an implementation of the present disclosure.

In 210, a terminal device sends first information on a first resource and sends second information on a second resource.

In 220, the terminal device detects third information on a group of third pre-configured resources in a first window.

A start position of the first window may include, but is not limited to:
a position after a first time interval after the terminal device sends the second information; or
a first time unit after the first time interval after the terminal device sends the second information; or
a first time unit with the third pre-configured resource existing after the first time interval after the terminal device sends the second information.

The so-called time unit refers to a general time parameter, which may be a Sub-frame, a slot, or a symbol. This is not particularly restricted in this implementation.

In 230, the terminal device receives fourth information on a fourth resource.

A main idea of the present disclosure is to combine the first step (Msg1) and the third step (Msg3) of the existing four-step contention-based random access procedure into a first step (Message A, Msg A) of a random access procedure according to the present disclosure, and combine the second step (Msg2) and the fourth step (Msg4) of the existing four-step contention-based random access procedure into a second step (Message B, Msg B) of the two-step contention-based random access procedure according to the present disclosure. In this way, a complete random access procedure is simplified from four steps to two steps, and information interaction needs to be performed only once between the terminal device and the network device, which can effectively reduce the delay overhead of random access, thus the random access of the terminal device in a low-latency scenario is achieved.

Figure 2B:
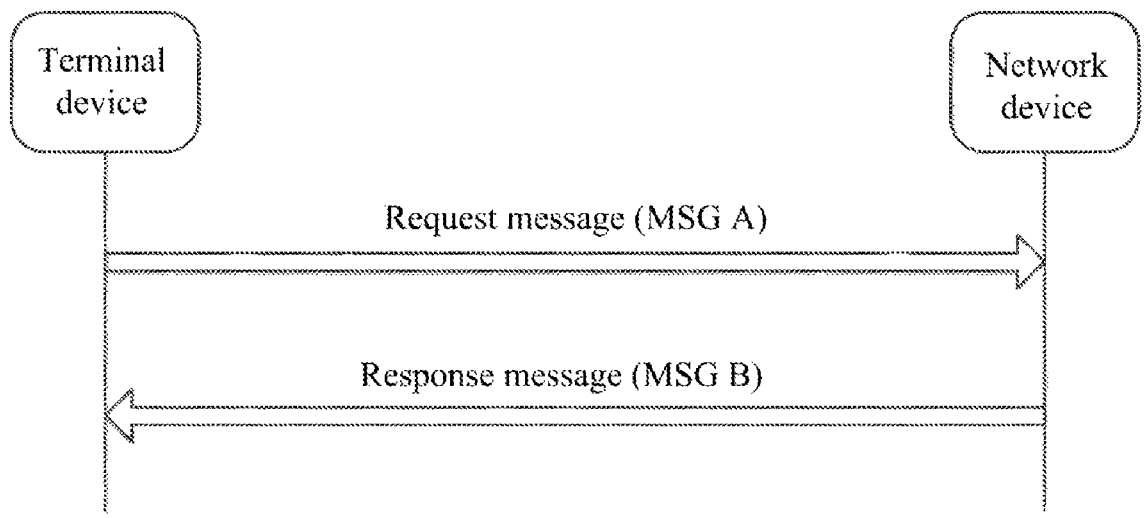
FIG. 2B is a schematic diagram of a two-step contention-based random access procedure according to an implementation of the present disclosure.

In the present disclosure, the two-step contention-based random access procedure may be shown in FIG. 2B, and its basic features include a request message (Msg A) sent by the terminal device and a response message (Msg B) received by the terminal device. Specifically, in the first step of the two-step contention-based random access procedure, the terminal device needs to send the first information (e.g., Preamble) and the second information (e.g., data). For example, the Preamble is sent on a Physical Random Access CHannel (PRACH) occasion (RO) resource, and the data is sent on a Physical Uplink Shared CHannel (PUSCH) resource.

Based on the above analysis, it can be found that the two-step contention-based random access procedure can bring advantages such as simplified steps and shortened delay of the random access.

Optionally, in a possible implementation mode of this implementation, in 210, the terminal device may specifically send the first information to the network device on the first resource and send the second information to the network device on the second resource.

Msg A may be formed by the first information (such as the preamble) and the second information (such as the data). Specifically, the terminal device may send the first information to the network device on the first resource and send the second information to the network device on the second resource.

The first resource is a pre-configured resource of a group of first pre-configured resources, for example, one of a group of RO resources. The second resource is a pre-configured resource of a group of second pre-configured resources, for example, a pre-configured resource in a control resource set (CORESET) formed by pre-configured resources appearing periodically.

On the CORESET, the second information is transmitted through a Physical Uplink Control CHannel (PUCCH).

In a specific implementation process, the terminal device may specifically determine a group of first pre-configured resources, and then the terminal device may select a first pre-configured resource from the group of first pre-configured resources as the first resource.

The group of first pre-configured resources may be determined by a protocol or may also be indicated by the network device, and this is not particularly restricted in this implementation.

Specifically, the terminal device may specifically receive at least one piece of the following information sent by the network device for indicating the group of first pre-configured resources:

a system broadcast message;
a higher layer signaling; and
a physical layer signaling.

The information may specifically indicate resource locations of the group of first pre-configured resources, and the resource locations may include but are not limited to time domain resource locations and/or frequency domain resource locations.

For example, the existing Master Information Block (MIB) or System Information Block (SIB) in a system broadcast message may be used for carrying configuration information to indicate the group of first pre-configured resources, or a new SIB may be added for carrying configuration information to indicate the group of first pre-configured resources.

Or, for another example, the higher layer signaling may be a radio physical resource control (RRC) message, which may carry configuration information through an Information Element (IE) in the RRC message to indicate the group of first pre-configured resources. The RRC message may be an RRC message in the prior art, such as an RRC connection reconfiguration message, and this is not restricted in this implementation. The configuration information is carried by extending the IE of the existing RRC message to indicate the group of first pre-configured resources, or the RRC message may be different from the existing RRC messages in the prior art.

Or, for another example, the higher layer signaling may be a Media Access Control (MAC) Control Element (CE) message, and the configuration information may be specifically carried by adding a new MAC CE message to indicate the group of first pre-configured resources.

Or, for another example, the physical layer signaling may be Downlink control information (DCI), and specifically, the configuration information may be carried by the DCI to indicate the group of first pre-configured resources.

In this implementation process, a mode in which the terminal device selects a first pre-configured resource from the group of first pre-configured resources is similar to a mode in the prior art, herein a Synchronization Signal Block (SSB), that is, a SS/PBCH block may be associated with the first pre-configured resource. The association mode between the SSB and the first pre-configured resource may be determined by a protocol or may also be indicated by the network device, and this is not particularly restricted in this implementation. A Primary Synchronization Signal (PSS), a Secondary Synchronization Signal (SSS), and a Physical Broadcasting Channel (PBCH) together form a Synchronization Signal Block (SSB), that is, a SS/PBCH block. For a detailed description about how the network device indicates the association mode between the SSB and the first pre-configured resource, reference may be made to the related contents of the network device indicating the group of first pre-configured resources.

For example, the terminal device may first determine an SSB, and then determine a first pre-configured resource associated with the SSB as the first resource.

In another specific implementation process, the terminal device may specifically determine a group of second pre-configured resources, and then the terminal device may select a second pre-configured resource from the group of second pre-configured resources as the second resource.

The group of second pre-configured resources may be determined by a protocol or may also be indicated by the network device, and this is not particularly restricted in this implementation.

Specifically, the terminal device may specifically receive at least one piece of the following information sent by the network device for indicating the group of second pre-configured resources:

a system broadcast message;
a higher layer signaling; and
a physical layer signaling.

The information may specifically indicate resource locations of the group of second pre-configured resources, and the resource locations may include, but are not limited to, time domain resource locations and/or frequency domain resource locations.

For example, the existing Master Information Block (MIB) or System Information Block (SIB) in a system broadcast message may be used for carrying configuration information to indicate the group of second pre-configured resources, or a new SIB may be added for carrying configuration information to indicate the group of second pre-configured resources.

Or, for another example, the higher layer signaling may be a radio physical resource control (RRC) message, which may carry configuration information through an Information Element (IE) in the RRC message to indicate the group of second pre-configured resources. The RRC message may be an RRC message in the prior art, such as an RRC connection reconfiguration message, and this is not restricted in this implementation. The configuration information is carried by extending the IE of the existing RRC message to indicate the group of second pre-configured resources, or the RRC message may be different from the existing RRC messages in the prior art.

Or, for another example, the higher layer signaling may be a Media Access Control (MAC) Control Element (CE) message, and the configuration information may be specifically carried by adding a new MAC CE message to indicate the group of first pre-configured resources.

Or, for another example, the physical layer signaling may be Downlink control information (DCI), and specifically, the configuration information may be carried by the DCI to indicate the group of second pre-configured resources.

In this implementation process, a mode in which the terminal device selects a second pre-configured resource from the group of second pre-configured resources may be associating an SSB with the second pre-configured resource or associating a first pre-configured resource with the second pre-configured resource. The association mode between the SSB and the second pre-configured resource as well as the association mode between the first pre-configured resource and the second pre-configured resource may be determined by a protocol or may also be indicated by the network device, and this is not particularly restricted in this implementation. For a detailed description about how the network device indicates the association mode between the SSB and the second pre-configured resource and how the network device indicates the association mode between the first pre-configured resource and the second pre-configured resource, reference may be made to the related contents of the network device indicating the group of first pre-configured resources.

For example, the terminal device may first determine an SSB, and then determine a first pre-configured resource and a second pre-configured resource associated with the SSB as the first resource and the second resource, respectively.

Or, for another example, the terminal device may first determine an SSB, and then determine a first pre-configured resource associated with the SSB as the first resource. After determining the first resource, the terminal device may further determine a second pre-configured resource associated with the first resource as the second resource.

Figure 2C:
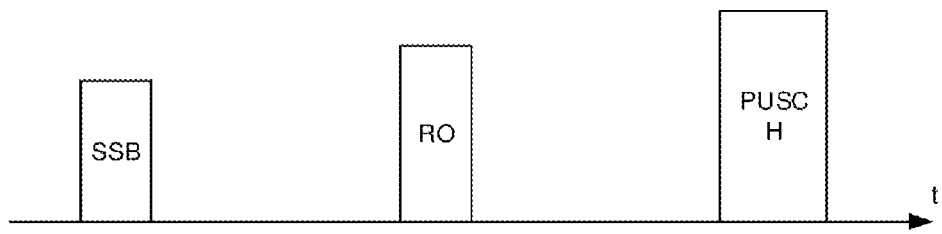
FIG. 2C is a schematic diagram of a two-step contention-based random access procedure according to an implementation of the present disclosure.
Figure 2D:
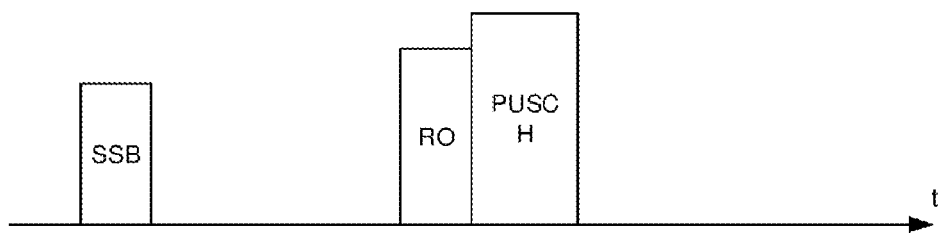
FIG. 2D is a schematic diagram of a two-step contention-based random access procedure according to an implementation of the present disclosure.

In the present disclosure, the first pre-configured resource and the second pre-configured resource may be separated in time domain resources or frequency domain resources, as shown in FIG. 2C, or may be continuous, as shown in FIG. 2D.

Optionally, in a possible implementation mode of this implementation, in 220 and 230, the terminal device may specifically detect the third information sent by the network device on a group of third pre-configured resources in the first window, and then the terminal device can detect fourth information sent by the network device on a fourth resource according to the detected third information.

Msg B may be formed by the third information (such as control information carried on a PDCCH) and the fourth information (such as data carried on a PDSCH).

The third resource is one of a group of third pre-configured resources, for example, a pre-configured resource in a control resource set (CORESET) formed by pre-configured resources appearing periodically. On the CORESET, the third information is transmitted through a Physical Downlink Control CHannel (PDCCH). The third information may be used for indicating a resource location of the fourth resource sending the fourth information, wherein the resource location may include but is not limited to a time domain resource location and/or a frequency domain resource location.

The group of third pre-configured resources may be determined by a protocol or may also be indicated by the network device, and this is not particularly restricted in this implementation.

Specifically, the terminal device may specifically receive at least one piece of the following information sent by the network device for indicating the group of third pre-configured resources:
 a system broadcast message;
 a higher layer signaling; and
 a physical layer signaling.

The information may specifically indicate resource locations of the group of third pre-configured resources, and the resource locations may include but are not limited to time domain resource locations and/or frequency domain resource locations.

For example, the existing Master Information Block (MIB) or System Information Block (SIB) in a system broadcast message may be used for carrying configuration information to indicate the group of third pre-configured resources, or a new SIB may be added for carrying configuration information to indicate the group of third pre-configured resources.

Or, for another example, the higher layer signaling may be a radio physical resource control (RRC) message, which may carry configuration information through an Information Element (IE) in the RRC message to indicate the group of third pre-configured resources. The RRC message may be an RRC message in the prior art, such as an RRC connection reconfiguration message, and this is not restricted in this implementation. The configuration information is carried by extending the IE of the existing RRC message to indicate the group of third pre-configured resources, or the RRC message may be different from the existing RRC messages in the prior art.

Or, for another example, the higher layer signaling may be a Media Access Control (MAC) Control Element (CE) message, and the configuration information may be specifically carried by adding a new MAC CE message to indicate the group of first pre-configured resources.

Or, for another example, the physical layer signaling may be Downlink control information (DCI), and specifically, the configuration information may be carried by the DCI to indicate the group of third pre-configured resources.

Specifically, the terminal device may detect a third channel (such as a PDCCH) on the group of third pre-configured resources, and then acquire, on the third channel, the third information (e.g., control information carried on a PDCCH) sent by the network device.

In this implementation process, the method in which the terminal device detects the third channel (such as a PDCCH) on the group of third pre-configured resources may be to detect whether there is a third channel scrambled by a third sequence on the third resource.

The fourth information is carried on the fourth resource, and the third information indicates the resource location of the fourth resource, which may include but is not limited to a time domain resource location and/or a frequency domain resource location. The terminal device may specifically receive, on the fourth resource, the fourth information sent by the network device.

Figure 2E:
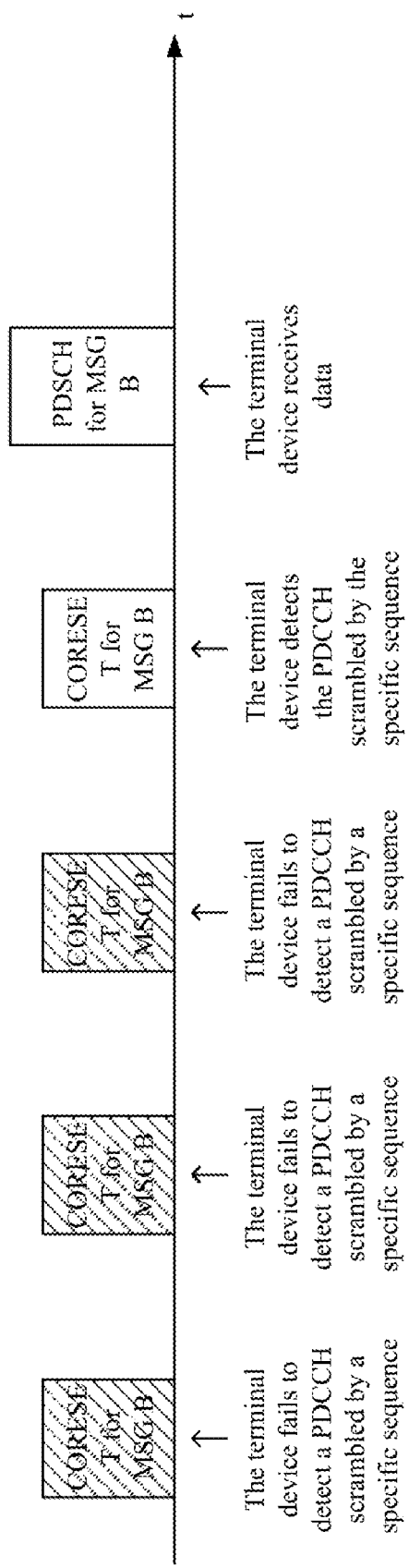
FIG. 2E is a schematic diagram of a two-step contention-based random access procedure according to an implementation of the present disclosure.

The terminal device determines a receiving resources for Msg B, as shown in FIG. 2E. The terminal device acquires configuration information of CORESET, wherein the configuration information indicates locations of a group of CORESETs which appear periodically, and the terminal device detects Msg B on this group of CORESETs. A DCI message in a PDCCH carried in the CORESET indicates a time-frequency resource configuration for data reception by the terminal device and indicates other configuration information. The terminal device may determine time-frequency resource locations and configuration information for the data reception according to the DCI message, and receive data at the determined time-frequency resource locations based on contents indicated by the configuration information.

Figure 2F:
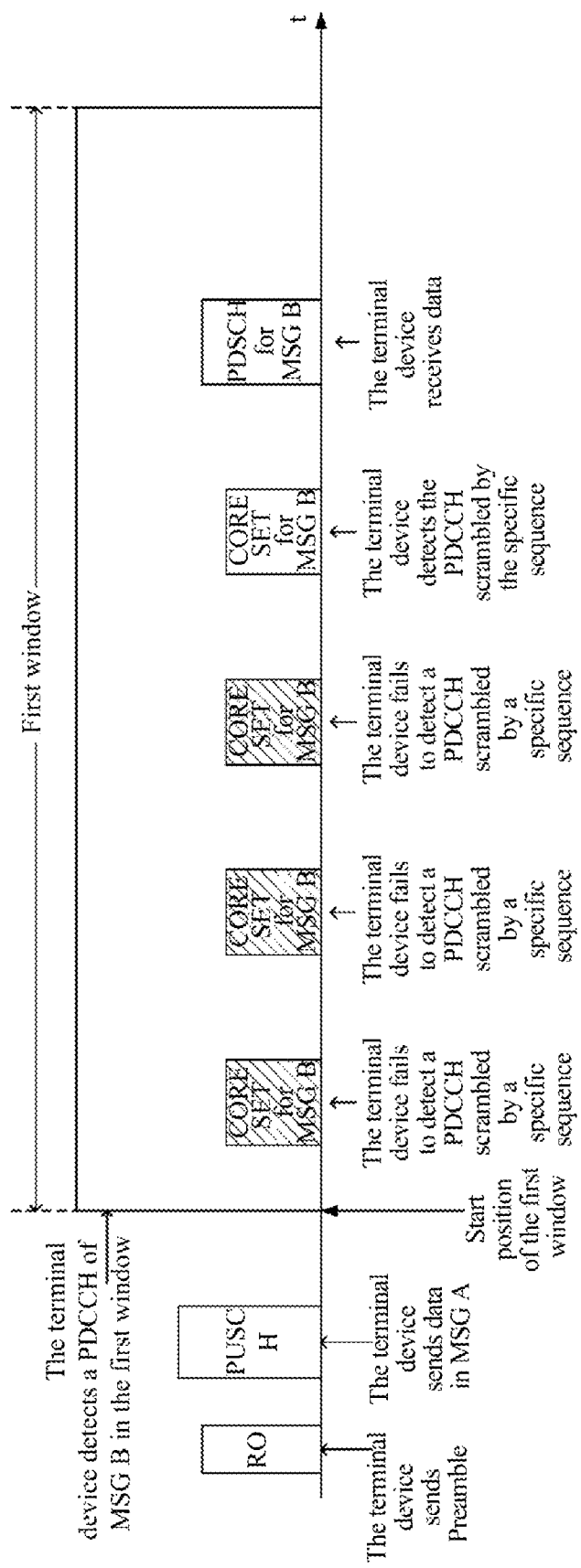
FIG. 2F is a schematic diagram of a two-step contention-based random access procedure according to an implementation of the present disclosure.

In the two-step contention-based random access procedure according to the present disclosure, how should timing of detecting Msg B by the terminal device be determined? To solve this problem, considering requirements on the complexity of detection by a terminal device and the flexibility of scheduling at a network side, after the terminal device sends the second information to the network device on the second resource, the terminal device may specifically detect the third information on a group of third pre-configured resources in the first window. Specifically, the terminal device may specifically detect whether there is a third channel scrambled by a third sequence on the group of third pre-configured resources in the first window, as shown in FIG. 2F. The terminal device acquires configuration information of CORESET, wherein the configuration information indicates locations of a group of CORESETs which appear periodically, and the terminal device detects Msg B on this group of CORESETs. A DCI message in a PDCCH carried in the CORESET indicates a time-frequency resource configuration for data reception by the terminal device and indicates other configuration information. According to the DCI message, the terminal device determines time-frequency resource locations and configuration information for the data reception, and receives data at the determined time-frequency resource locations based on contents indicated by the configuration information.

Optionally, in a possible implementation mode of this implementation, in 220, a value of the first time interval in the first window adopted by the terminal device may be 0, or may also be greater than 0, and this is not particularly restricted in this implementation.

In a specific implementation process, when the value of the first time interval is 0, the start position of the first window may be simplified as, including but not limited to:
- a position after the terminal device sends the second information; or
- a first time unit after the terminal device sends the second information; or
- a first time unit with the third pre-configured resource existing after the terminal device sends the second information.

Optionally, in a possible implementation mode of this implementation, in 220, a size of the first window adopted by the terminal device may be determined by a protocol or may also be indicated by the network device, this is not particularly restricted in this implementation.

Specifically, the terminal device may specifically receive at least one piece of the following information sent by the network device for indicating the size of the first window:
- a system broadcast message;
- a higher layer signaling; and
- a physical layer signaling.

For example, the existing Master Information Block (MIB) or System Information Block (SIB) in a system broadcast message may be used for carrying indication information to indicate the size of the first window, or a new SIB may be added for carrying indication information to indicate the size of the first window.

Or, for another example, the higher layer signaling may be a radio physical resource control (RRC) message, which may carry indication information through an Information Element (IE) in the RRC message to indicate the size of the first window. The RRC message may be an RRC message in the prior art, such as an RRC connection reconfiguration message, and this is not restricted in this implementation. The indication information is carried by extending the IE of the existing RRC message to indicate the size of the first window, or the RRC message may be different from the existing RRC messages in the prior art.

Or, for another example, the higher layer signaling may be a Media Access Control (MAC) Control Element (CE) message, and the indication information may be specifically carried by adding a new MAC CE message to indicate the size of the first window.

Or, for another example, the physical layer signaling may be Downlink control information (DCI), and specifically, the indication information may be carried by the DCI to indicate the size of the first window.

In the two-step contention-based random access procedure according to the present disclosure, some special circumstances are considered. For example, the terminal device sends the first information and the second information in Msg A, but the network device only receives part of information of Msg A, such as only the first information of Msg A, but not the second information of MSG A. Then, at this time, it is obviously unnecessary for the terminal device to resend Msg A, the network device can directly send fifth information on a fifth resource based on the received first information. That is to say, the two-step contention-based random access procedure initiated by the terminal device is regressed to the existing four-step contention-based random access procedure.

Optionally, in a possible implementation mode of this implementation, the terminal device may further detect the fifth information on a group of fifth pre-configured resources.

The fifth resource is one of a group of fifth pre-configured resources, for example, a pre-configured resource in a control resource set (CORESET) formed by pre-configured resources appearing periodically. On the CORESET, the fifth information, such as a Random Access Response (RAR) message, is transmitted through a Physical Downlink Control CHannel (PDCCH). The fifth information may be used for indicating a resource location of a sixth resource for sending sixth information, wherein the resource location may include but is not limited to a time domain resource location and/or a frequency domain resource location.

The group of fifth pre-configured resources may be determined by a protocol or may also be indicated by the network device, and this is not particularly restricted in this implementation.

Specifically, the terminal device may specifically receive at least one piece of the following information sent by the network device for indicating the group of fifth pre-configured resources:
- a system broadcast message;
- a higher layer signaling; and
- a physical layer signaling.

The information may specifically indicate resource locations of the group of fifth pre-configured resources, and the resource locations may include but are not limited to time domain resource locations and/or frequency domain resource locations.

For example, the existing Master Information Block (MIB) or System Information Block (SIB) in a system broadcast message may be used for carrying configuration information to indicate the group of fifth pre-configured resources, or a new SIB may be added for carrying configuration information to indicate the group of fifth pre-configured resources.

Or, for another example, the higher layer signaling may be a radio physical resource control (RRC) message, which may carry configuration information through an Information Element (IE) in the RRC message to indicate the group of fifth pre-configured resources. The RRC message may be an RRC message in the prior art, such as an RRC connection reconfiguration message, and this is not restricted in this implementation. The configuration information is carried by extending the IE of the existing RRC message to indicate the group of fifth pre-configured resources, or the RRC message may be different from the existing RRC messages in the prior art.

Or, for another example, the higher layer signaling may be a Media Access Control (MAC) Control Element (CE) message, and the configuration information may be specifically carried by adding a new MAC CE message to indicate the group of first pre-configured resources.

Or, for another example, the physical layer signaling may be Downlink control information (DCI), and specifically, the configuration information may be carried by the DCI to indicate the group of fifth pre-configured resources.

Specifically, the terminal device may specifically detect a fifth channel (such as a PDCCH carrying an RAR message) on the group of fifth pre-configured resources, and then acquire, on the fifth channel, the fifth information (such as the RAR message) sent by the network device.

Figure 2G:
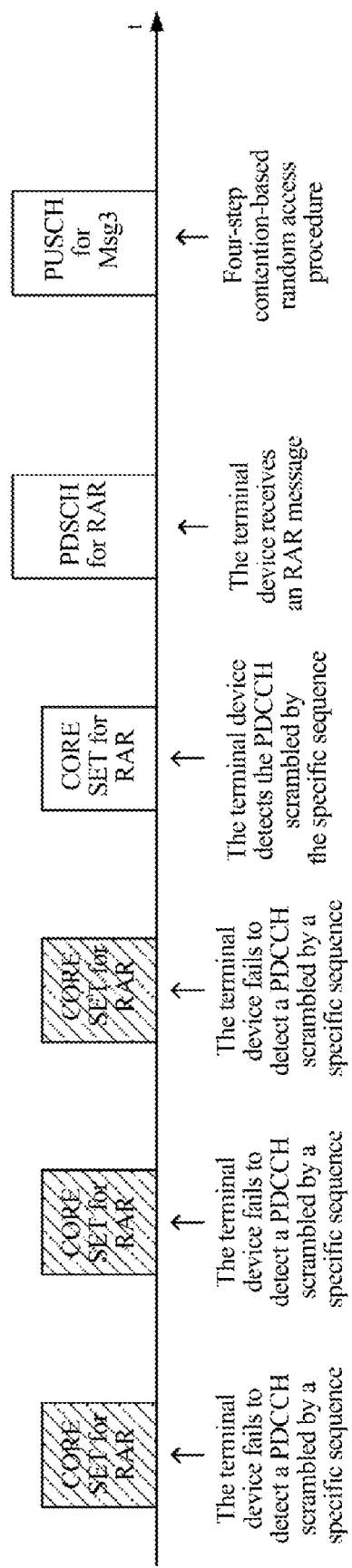
FIG. 2G is a schematic diagram of a two-step contention-based random access procedure according to an implementation of the present disclosure.

In this implementation process, the method in which the terminal device detects the fifth channel (such as the PDCCH carrying the RAR message) on the group of fifth pre-configured resources may be to detect whether there is a fifth channel scrambled by a fifth sequence (such as a specific Radio Network Temporary Identity (RNTI)) on the group of fifth pre-configured resources, for example, the UE detects a PDCCH scrambled by a specific RNTI on a CORESET of a pre-configured RAR message, as shown in FIG. 2G. The terminal device determines a time-frequency resource location and configuration information for receiving the RAR message according to the determined PDCCH, and receive the RAR message at the determined time-frequency resource location based on contents indicated by the configuration information. According to the RAR message, the terminal device determines a sending resource and a sending configuration of Msg3, and continues the four-step contention-based random access procedure.

In a specific implementation process, the terminal device may specifically detect the fifth information on the group of fifth pre-configured resources in the first window.

In this implementation process, the terminal device detects Msg B and the fifth information at the same time in the first window. At this time, it is needed to further deal with a relation between the two kinds of detections to avoid unnecessary redundant detection operations and behavior uncertainty caused by the redundant detection of the terminal device. Based on the above considerations, there are two situations as follows.

For example, if the terminal device detects the third information, the terminal device may stop detecting the fifth information on the group of fifth pre-configured resources in the first window.

Figure 2H:
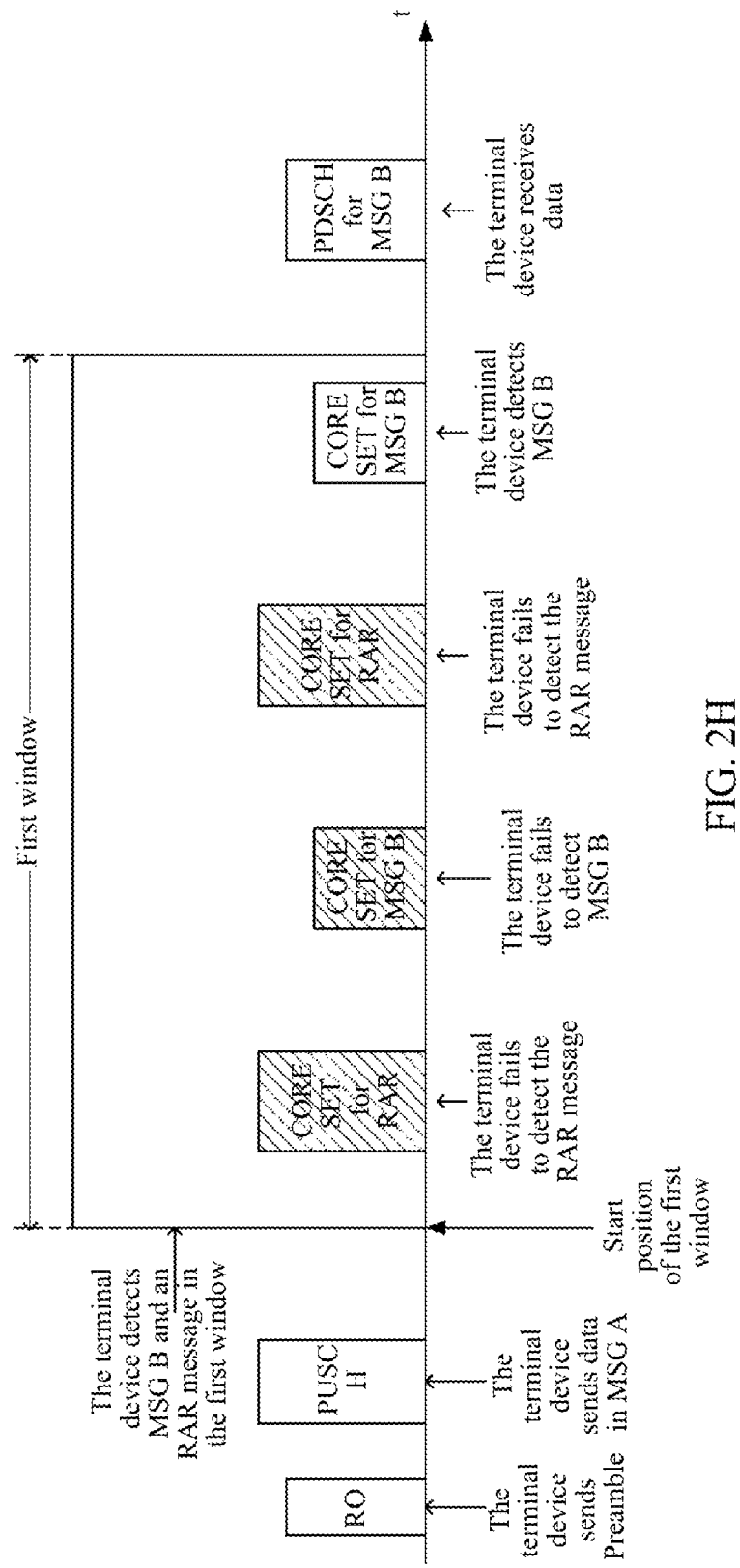
FIG. 2H is a schematic diagram of a two-step contention-based random access procedure according to an implementation of the present disclosure.

When the terminal device detects the third information in the first window, the corresponding situation is that after the terminal device sends Msg A to the network device, a received response message is not an RAR message of a four-step contention-based random access procedure, but a Msg B of a two-step contention-based random access procedure. At this time, the two-step contention-based random access procedure is normally performed. In the above situation, the terminal device may stop continuing detecting Msg B on the group of third pre-configured resources in the first window, that is, the terminal device stops continuing detecting whether there is a third channel scrambled by a third sequence on the group of third pre-configured resources in the first window. Moreover, the terminal device may stop continuing detecting an RAR message on the group of fifth pre-configured resources in the first window, that is, the terminal device may stop continuing detecting whether there is a fifth channel scrambled by a fifth sequence on the group of fifth pre-configured resources in the first window, as shown in FIG. 2H. The terminal device obtains configuration information of the CORESET of the RAR message, and the terminal device detects the RAR message on this group of CORESET. The terminal device obtains configuration information of CORESET of Msg B, and the terminal device detects Msg B on this group of CORESET. The terminal device detects Msg B, and a DCI message in a PDCCH carried in the CORESET of Msg B indicates a time-frequency resource configuration for data reception by the terminal device and indicates other configuration information. According to the DCI message, the terminal device determines a time-frequency resource location and configuration information for the data reception, and receives data at the determined time-frequency resource location based on contents indicated by the configuration information.

Or, for another example, if the terminal device detects the fifth information, the terminal device may stop detecting the third information on the group of third pre-configured resources in the first window, and then the terminal device may send the sixth information on the sixth resource.

The sixth information is carried on the sixth resource, and the fifth information indicates a resource location of the sixth resource, which may include but is not limited to a time domain resource location and/or a frequency domain resource location. The terminal device may specifically send the sixth information to the network device on the sixth resource.

Figure 2I:
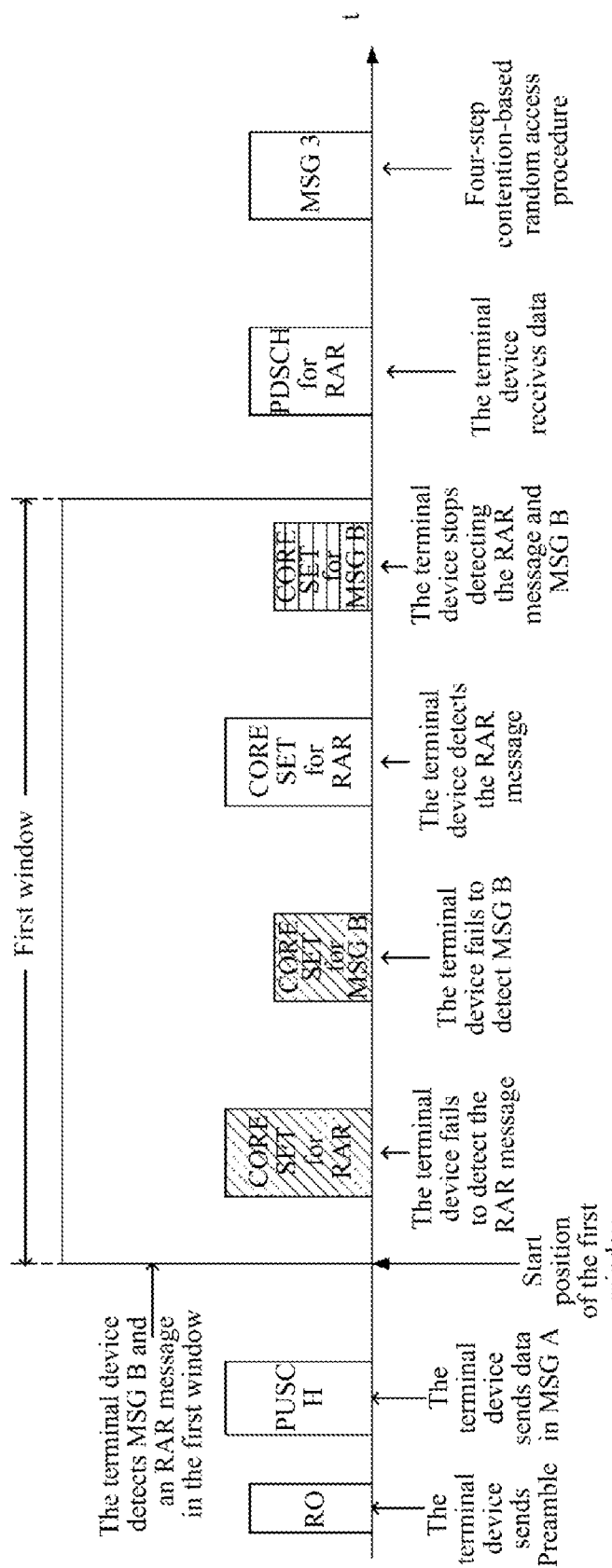
FIG. 2I is a schematic diagram of a two-step contention-based random access procedure according to an implementation of the present disclosure.

When the terminal device detects an RAR message in the first window, the corresponding situation is that after the terminal sends Msg A to the network device, the received response message is not Msg B of a two-step contention-based random access procedure, but an RAR message of a four-step contention-based random access procedure. At this time, the two-step contention-based random access procedure is regressed to the four-step contention-based random access procedure. In the above situation, the terminal device may stop continuing detecting RAR message on the group of fifth pre-configured resources in the first window, that is, the terminal device stops continuing detecting whether there is a fifth channel scrambled by a fifth sequence on the group of fifth pre-configured resources in the first window. Moreover, the terminal device may stop continuing detecting Msg B on the group of third pre-configured resources in the first window, that is, the terminal device stops continuing detecting whether there is a third channel scrambled by a third sequence on the group of third pre-configured resources in the first window. After detecting the RAR message, the terminal device obtains an indication of the resource location of the sixth resource sent by Msg3 and a sending mode from the RAR message, and the terminal device sends the sixth information at the indicated resource location by using the indicated sending mode, as shown in FIG. 2I. The terminal device obtains configuration information of the CORESET of the RAR message, and the terminal device detects the RAR message on this group of CORESET. The RAR message indicates required resource information for sending of Msg3. The terminal device obtains configuration information of CORESET of Msg B, and the terminal device detects Msg B on this group of CORESET. The terminal device detects the RAR message, and a DCI message in PDCCH carried in the CORESET of the RAR message indicates time-frequency resource configuration for the terminal device to receive MsgB data and indicates other configuration information. According to the DCI message, the terminal device determines a time-frequency resource location and configuration information for the data reception, and receives data at the determined time-frequency resource location based on contents indicated by the configuration information. The terminal device transmits Msg3 based on uplink scheduling information provided in the RAR message, and continues the four-step contention-based random access procedure.

The sixth information is carried on the sixth resource, and the fifth information indicates the resource location of the sixth resource, which may include but is not limited to a time domain resource location and/or a frequency domain resource location. The terminal device may specifically send the sixth information to the network device on the sixth resource.

In another specific implementation process, the terminal device may specifically detect the fifth information on the group of fifth pre-configured resources in a second window.

A start time of the second window may include but is not limited to:
- a position after a second time interval after the terminal device sends the first information; or
- a first time unit after the second time interval after the terminal device sends the first information; or
- a first time unit with the fifth pre-configured resource existing after the second time interval after the terminal device sends the first information.

In this implementation process, after the terminal device sends the first information, the terminal device may activate the second window, and detect the fifth information on the group of fifth pre-configured resources in the second window.

A value of the second time interval in the first window adopted by the terminal device may be 0, or may also be greater than 0, and this is not particularly restricted in this implementation.

In a specific implementation process, when the value of the second time interval is 0, the start time of the second window may be simplified as, including but not limited to:
- a position after the terminal device sends the first information; or
- a first time unit after the terminal device sends the first information; or
- a first time unit with the fifth pre-configured resource existing after the terminal device sends the first information.

A size of the second window adopted by the terminal device may be determined by a protocol or may also be indicated by the network device, and this is not particularly restricted in this implementation.

Specifically, the terminal device may specifically receive at least one piece of the following information sent by the network device for indicating the size of the second window:
- a system broadcast message;
- a higher layer signaling; and
- a physical layer signaling.

For example, the existing Master Information Block (MIB) or System Information Block (SIB) in a system broadcast message may be used for carrying indication information to indicate the size of the second window, or a new SIB may be added for carrying indication information to indicate the size of the second window.

Or, for another example, the higher layer signaling may be a radio physical resource control (RRC) message, which may carry indication information through an Information Element (IE) in the RRC message to indicate the size of the second window. The RRC message may be an RRC message in the prior art, such as an RRC connection reconfiguration message, and this is not restricted in this implementation. The indication information is carried by extending the IE of the existing RRC message to indicate the size of the second window, or the RRC message may be different from the existing RRC messages in the prior art.

Or, for another example, the higher layer signaling may be a Media Access Control (MAC) Control Element (CE) message, and the indication information may be specifically carried by adding a new MAC CE message to indicate the size of the second window.

Or, for another example, the physical layer signaling may be Downlink control information (DCI), and specifically, the indication information may be carried by the DCI to indicate the size of the second window.

In this process, the terminal device detects Msg B in the first window and detects the fifth information in the second window. At this time, there are the following two situations.

For example, if the terminal device detects the third information, the terminal device may stop detecting the fifth information on the group of fifth pre-configured resources in the second window.

When the terminal device detects the third information in the first window, the corresponding situation is that in a process of the terminal device sending Msg A to the network device (for example, after the first information is sent, the second information is not sent yet), or after the terminal device sends Msg A, a received response message is not an RAR message of a four-step contention-based random access procedure, but Msg B of a two-step contention-based random access procedure. At this time, the two-step contention-based random access procedure is normally performed. In the above situation, the terminal device may stop continuing detecting Msg B on the group of third pre-configured resources in the first window, that is, the terminal device stops continuing detecting whether there is a third channel scrambled by a third sequence on the group of third pre-configured resources in the first window. Moreover, the terminal device may stop detecting an RAR message on the group of fifth pre-configured resources in the second window, that is, the terminal device may stop detecting whether there is a fifth channel scrambled by a fifth sequence on the group of fifth pre-configured resources in the first window.

Or, for another example, if the terminal device detects the fifth information, the terminal device may not perform the operation of sending the second information on the second resource, or the terminal device may stop detecting the third information on the group of third pre-configured resources in the first window, and the terminal device sends the sixth information on the sixth resource.

The sixth information is carried on the sixth resource, and the fifth information indicates the resource location of the sixth resource, which may include but is not limited to a time domain resource location and/or a frequency domain resource location. The terminal device may specifically send the sixth information to the network device on the sixth resource.

There are two corresponding situations when the terminal device detects an RAR message in the second window.

Figure 2J:
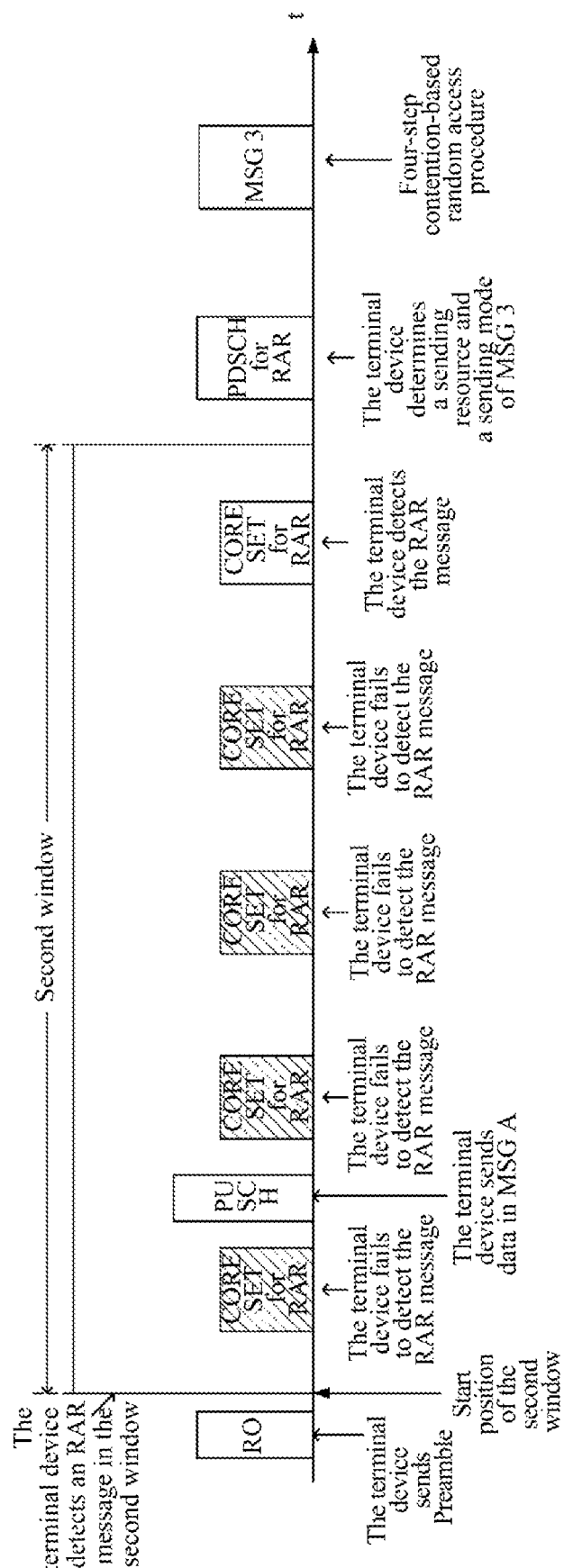
FIG. 2J is a schematic diagram of a two-step contention-based random access procedure according to an implementation of the present disclosure.

In one situation, after the terminal sends Msg A to the network device, the received response message is not Msg B of a two-step contention-based random access procedure, but an RAR message of a four-step contention-based random access procedure. At this time, the two-step contention-based random access procedure is regressed to the four-step contention-based random access procedure. In the above situation, the terminal device may stop continuing detecting RAR message on the group of fifth pre-configured resources in the first window, that is, the terminal device stops continuing detecting whether there is a fifth channel scrambled by a fifth sequence on the group of fifth pre-configured resources in the first window. Moreover, the terminal device may stop continuing detecting Msg B on the group of third pre-configured resources in the first window, that is, the terminal device stops continuing detecting whether there is a third channel scrambled by a third sequence on the group of third pre-configured resources in the first window. After detecting the RAR message, the terminal device obtains an indication of the resource location of the sixth resource sent by Msg3 and a sending mode from the RAR message, and the terminal device sends the sixth information at the indicated resource location by using the indicated sending mode, as shown in FIG. 2J. The terminal device acquires configuration information of CORESET, wherein the configuration information indicates locations of a group of CORESETs which appear periodically, and terminal device detects an RAR message on this group of CORESETs. The RAR message indicates required resource information for sending of Msg3. According to the RAR message, the terminal device determines a sending resource and a sending mode of Msg3. A DCI message in a PDCCH carried in the CORESET indicates a time-frequency resource configuration for data reception by the terminal device and indicates other configuration information. The terminal device detects the RAR message, and the terminal device transmits Msg3 based on uplink scheduling information provided in the RAR message, and continues the four-step contention-based random access procedure.

Figure 2K:
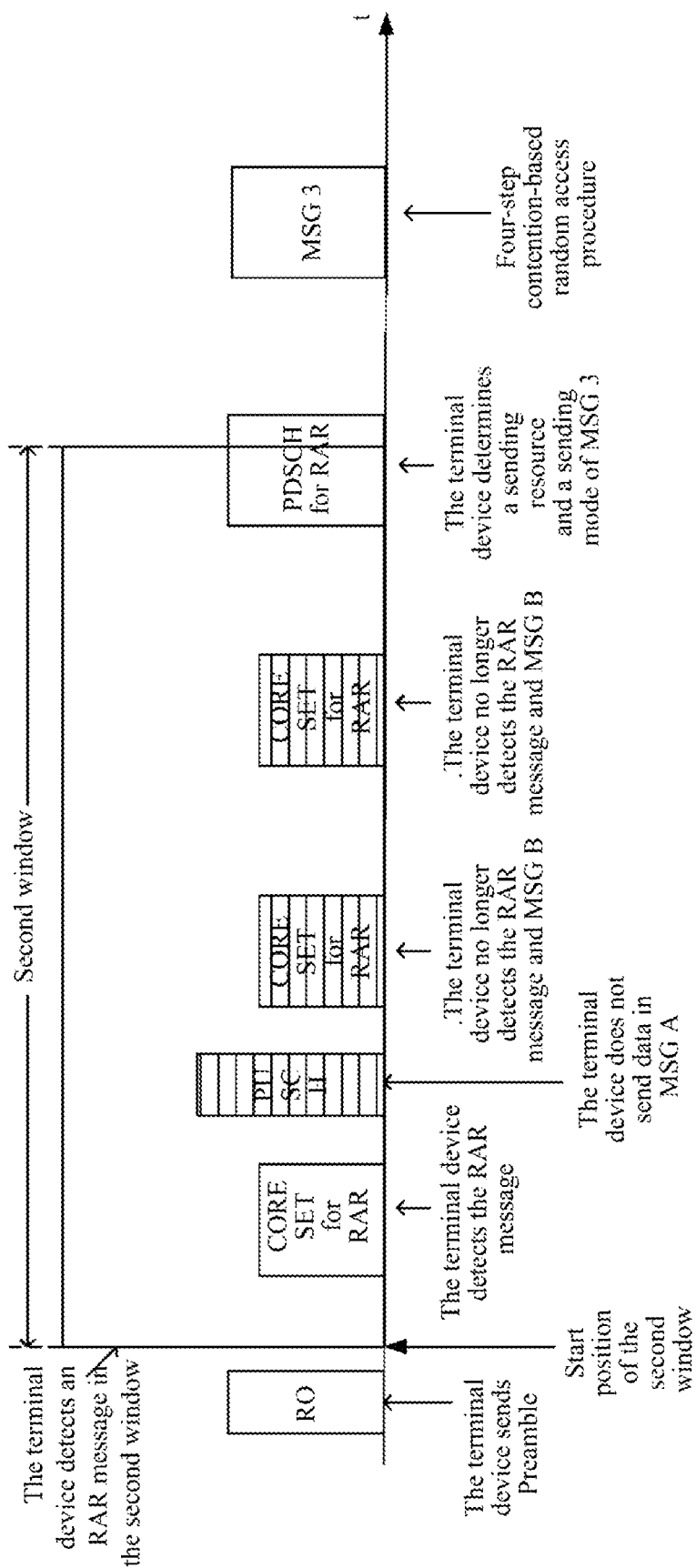
FIG. 2K is a schematic diagram of a two-step contention-based random access procedure according to an implementation of the present disclosure.

In the other situation, in a process of the terminal sending Msg A to the network device (for example, after the first information is sent, the second information is not sent yet), the received response message is not Msg B of a two-step contention-based random access procedure, but an RAR message of a four-step contention-based random access procedure. At this time, the two-step contention-based random access procedure is regressed to the four-step contention-based random access procedure. In the above situation, the terminal device may stop continuing detecting RAR message on the group of fifth pre-configured resources in the first window, that is, the terminal device stops continuing detecting whether there is a fifth channel scrambled by a fifth sequence on the group of fifth pre-configured resources in the first window. Moreover, the terminal device may stop sending the second information on the second resource, and the terminal device may stop continuing detecting Msg B on the group of third pre-configured resources in the first window, that is, the terminal device stops continuing detecting whether there is a third channel scrambled by a third sequence on the group of third pre-configured resources in the first window. After detecting the RAR message, the terminal device obtains an indication of the resource location of the sixth resource sent by Msg3 and a sending mode from the RAR message, and the terminal device sends the sixth information at the indicated resource location by using the indicated sending mode, as shown in FIG. 2K. The terminal device acquires configuration information of CORESET, wherein the configuration information indicates locations of a group of CORESETs which appear periodically, and terminal device detects an RAR message on this group of CORESETs. The RAR message indicates required resource information for sending of Msg3. According to the RAR message, the terminal device determines a sending resource and a sending mode of Msg3. A DCI message in a PDCCH carried in the CORESET indicates a time-frequency resource configuration for data reception by the terminal device and indicates other configuration information. The terminal device detects the RAR message, and the terminal device transmits Msg3 based on uplink scheduling information provided in the RAR message, and continues the four-step contention-based random access procedure.

In this implementation mode, considering that the first window and the second window may overlap in time, when the first window and the second window overlap in time (the overlapping part is referred to as a third window), the terminal device needs to detect the third information on the group of third pre-configured resources and detect the fifth information on the group of fifth pre-configured resources in the overlapping part, i.e., the third window. At this time, there are two situations as follows.

For example, when the terminal device detects the third information in the third window, the corresponding situation is that after the terminal device sends Msg A to the network device, a received response message is not an RAR message of a four-step contention-based random access procedure, but Msg B of a two-step contention-based random access procedure. At this time, the two-step contention-based random access procedure is normally performed. In the above situation, the terminal device may stop continuing detecting Msg B on the group of third pre-configured resources in the first window, that is, the terminal device stops continuing detecting whether there is a third channel scrambled by a third sequence on the group of third pre-configured resources in the first window. Moreover, the terminal device may stop continuing detecting an RAR message on the group of fifth pre-configured resources in the second window, that is, the terminal device may stop detecting whether there is a fifth channel scrambled by a fifth sequence on the group of fifth pre-configured resources in the second window.

Or, for another example, when the terminal device detects an RAR message in the first window, the corresponding situation is that after the terminal sends Msg A to the network device, the received response message is not Msg B of a two-step contention-based random access procedure, but an RAR message of a four-step contention-based random access procedure. At this time, the two-step contention-based random access procedure is regressed to the four-step contention-based random access procedure. In the above situation, the terminal device may stop continuing detecting RAR message on the group of fifth pre-configured resources in the first window, that is, the terminal device stops continuing detecting whether there is a fifth channel scrambled by a fifth sequence on the group of fifth pre-configured resources in the first window. Moreover, the terminal device may stop continuing detecting Msg B on the group of third pre-configured resources in the first window, that is, the terminal device stops continuing detecting whether there is a third channel scrambled by a third sequence on the group of third pre-configured resources in the first window. After detecting the RAR message, the terminal device obtains an indication of the resource location of the sixth resource sent by Msg3 and a sending mode from the RAR message, and the terminal device sends the sixth information at the indicated resource location by using the indicated sending mode.

In this way, by detecting the third information and the fifth information simultaneously in the overlapping part (i.e. the third window) between the first window and the second window in time, and interrupting each other, the uncertainty of the subsequent behavior of the network device and the terminal device caused by unnecessary redundant transmission and detection operations by the terminal device can be avoided, performance of the two-step contention-based random access is improved, and the delay overhead of the random access is further reduced.

Optionally, in a possible implementation mode of this implementation, the terminal device may further receive indication information to indicate whether the terminal device is allowed to perform the operation of detecting the fifth information on the group of fifth pre-configured resources.

Specifically, the terminal device may specifically receive the indication information sent by the network device to indicate whether the terminal device is allowed to perform the operation of detecting the fifth information on the group of fifth pre-configured resources.

The terminal device may specifically receive the indication information sent by the network device through at least one piece of the following information to indicate the size of the second window:

a system broadcast message;

a higher layer signaling; and a physical layer signaling.

For example, an existing Master Information Block (MIB) or System Information Block (SIB) in a system broadcast message may be used for indicating whether the terminal device is allowed to perform the operation of detecting the fifth information on the group of fifth pre-configured resources, or a new SIB may be added for carrying indication information to indicate whether the terminal device is allowed to perform the operation of detecting the fifth information on the group of fifth pre-configured resources.

Or, for another example, the higher layer signaling may be a radio physical resource control (RRC) message, which may carry indication information through an Information Element (IE) in the RRC message to indicate whether the terminal device is allowed to perform the operation of detecting the fifth information on the group of fifth pre-configured resources. The RRC message may be an RRC message in the prior art, such as an RRC connection reconfiguration message, and this is not restricted in this implementation. The indication information is carried by extending the IE of the existing RRC message to indicate whether the terminal device is allowed to perform the operation of detecting the fifth information on the group of fifth pre-configured resources, or the RRC message may be different from the existing RRC messages in the prior art.

Or, for another example, the higher layer signaling may be a Media Access Control (MAC) Control Element (CE) message, and the indication information may be specifically carried by adding a new MAC CE message to indicate whether the terminal device is allowed to perform the operation of detecting the fifth information on the group of fifth pre-configured resources.

Or, for another example, the physical layer signaling may be Downlink control information (DCI), and specifically, the indication information may be carried by the DCI to indicate whether the terminal device is allowed to perform the operation of detecting the fifth information on the group of fifth pre-configured resources.

In this implementation mode, the indication information may be further used for instructing the terminal device to perform the operation of detecting the fifth information on the group of fifth pre-configured resources in the first window or to perform the operation of detecting the fifth information on the group of fifth pre-configured resources in the second window.

For example, the indication information may specifically contain information of 1 bit, wherein a value 0 of the bit indicates that the terminal device is instructed to perform the operation of detecting the fifth information on the group of fifth pre-configured resources in the first window, and a value 1 of the bit indicates that the terminal device is instructed to perform the operation of detecting the fifth information on the group of fifth pre-configured resources in the second window, or vice versa, the value 1 of the bit indicates that the terminal device is instructed to perform the operation of detecting the fifth information on the group of fifth pre-configured resources in the first window, and the value 0 of the bit indicates that the terminal device is instructed to perform the operation of detecting the fifth information on the group of fifth pre-configured resources in the second window.

The present disclosure provides a solution for detecting Msg B in a two-step contention-based random access procedure, and considering the situation that the two-step contention-based random access procedure is regressed to the four-step contention-based random access procedure, a detection solution design is proposed, in which reception of Msg B in the two-step random access procedure and reception of Msg 2 in the four-step random access procedure are both taken into account, a correlation between the two kinds of detections is analyzed and processed, thus unnecessary redundant operations of sending and detection in the two-step random access procedure are avoided, the performance of the two-step contention-based random access is improved, and the delay overhead of the random access is further reduced.

In this implementation, the terminal device sends the first information on the first resource and sends second information on the second resource, and then the terminal device detects the third information on the group of third pre-configured resources in the first window, so that the terminal device can receive the fourth information on the fourth resource. In this way, in a complete random access procedure, information interaction needs to be performed only once between the terminal device and the network device, which can effectively reduce the delay overhead of the random access, thus the random access of the terminal device in a low-latency scenario is achieved.

Figures 3, 4:
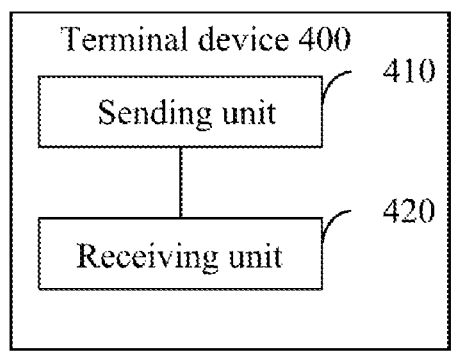
FIG. 3 is a schematic diagram of a method for random access according to an implementation of the present disclosure.
FIG. 4 is a schematic block diagram of a terminal device according to an implementation of the present disclosure.

FIG. 3 is a schematic diagram of another method for random access 300 according to an implementation of the present disclosure.

In 310, a network device detects first information on a group of first pre-configured resources and detects second information on a group of second pre-configured resources.

In 320, the network device sends third information on a group of third pre-configured resources in a first window.

A start position of the first window may include, but is not limited to:

a position after a first time interval after a terminal device sends the second information; or a first time unit after the first time interval after the terminal device sends the second information; or a first time unit with the third pre-configured resource existing after the first time interval after the terminal device sends the second information.

The so-called time unit refers to a general time parameter, which may be a Sub-frame, a slot, or a symbol. This is not particularly restricted in this implementation.

In 330, the network device sends fourth information on a fourth resource.

A main idea of the present disclosure is to combine the first step (Msg1) and the third step (Msg3) of the existing four-step contention-based random access procedure into a first step (Msg A) of a random access procedure according to the present disclosure, and combine the second step (Msg2) and the fourth step (Msg4) of the existing four-step contention-based random access procedure into a second step (Msg B) of the two-step contention-based random access procedure according to the present disclosure. In this way, a complete random access procedure is simplified from four steps to two steps, and information interaction needs to be performed only once between the terminal device and the network device, which can effectively reduce the delay overhead of random access, thus the random access of the terminal device in a low-latency scenario is achieved.

In the present disclosure, the two-step contention-based random access procedure may be shown in FIG. 2B, and its basic features include a request message (Msg A) sent by the terminal device and a response message (Msg B) received by the terminal device. Specifically, in the first step of the two-step contention-based random access procedure, the terminal device needs to send the first information (e.g., Preamble) and the second information (e.g., data). For example, the Preamble is sent on a Physical Random Access CHannel (PRACH) occasion (RO) resource, and the data is sent on a Physical Uplink Shared CHannel (PUSCH) resource.

Based on the above analysis, it can be found that the two-step contention-based random access procedure can bring advantages such as simplified steps and shortened delay of the random access.

Optionally, in a possible implementation mode of this implementation, in 310, the network device may specifically detect the first information sent by the terminal device on the group of first pre-configured resources, and detect the second information sent by the terminal device on the group of second pre-configured resources.

Msg A may be formed by the first information (such as the preamble) and the second information (such as the data). Specifically, the terminal device may send the first information to the network device on a first resource and send the second information to the network device on a second resource.

The first resource is a pre-configured resource of a group of first pre-configured resources, for example, one of a group of RO resources. The second resource is a pre-configured resource of a group of second pre-configured resources, for example, a pre-configured resource in a control resource set (CORE SET) formed by pre-configured resources appearing periodically. On the CORESET, the second information is transmitted through a Physical Uplink Control CHannel (PUCCH).

The group of first pre-configured resources may be determined by a protocol or may also be indicated by the network device, and this is not particularly restricted in this implementation.

Specifically, the network device may send at least one piece of the following information to the terminal device to indicate the group of first pre-configured resources:
 a system broadcast message;
 a higher layer signaling; and
 a physical layer signaling.

The information may specifically indicate resource locations of the group of first pre-configured resources, and the resource locations may include but are not limited to time domain resource locations and/or frequency domain resource locations.

For example, the existing Master Information Block (MIB) or System Information Block (SIB) in a system broadcast message may be used for carrying configuration information to indicate the group of first pre-configured resources, or a new SIB may be added for carrying configuration information to indicate the group of first pre-configured resources.

Or, for another example, the higher layer signaling may be a radio physical resource control (RRC) message, which may carry configuration information through an Information Element (IE) in the RRC message to indicate the group of first pre-configured resources. The RRC message may be an RRC message in the prior art, such as an RRC connection reconfiguration message, and this is not restricted in this implementation. The configuration information is carried by extending the IE of the existing RRC message to indicate the group of first pre-configured resources, or the RRC message may be different from the existing RRC messages in the prior art.

Or, for another example, the higher layer signaling may be a Media Access Control (MAC) Control Element (CE) message, and the configuration information may be specifically carried by adding a new MAC CE message to indicate the group of first pre-configured resources.

Or, for another example, the physical layer signaling may be Downlink control information (DCI), and specifically, the configuration information may be carried by the DCI to indicate the group of first pre-configured resources.

The group of second pre-configured resources may be determined by a protocol or may also be indicated by the network device, and this is not particularly restricted in this implementation.

Specifically, the network device may send at least one piece of the following information to the terminal device to indicate the group of second pre-configured resources:
 a system broadcast message;
 a higher layer signaling; and
 a physical layer signaling.

The information may specifically indicate resource locations of the group of second pre-configured resources, and the resource locations may include, but are not limited to, time domain resource locations and/or frequency domain resource locations.

For example, the existing Master Information Block (MIB) or System Information Block (SIB) in a system broadcast message may be used for carrying configuration information to indicate the group of second pre-configured resources, or a new SIB may be added for carrying configuration information to indicate the group of second pre-configured resources.

Or, for another example, the higher layer signaling may be a radio physical resource control (RRC) message, which may carry configuration information through an Information Element (IE) in the RRC message to indicate the group of second pre-configured resources. The RRC message may be an RRC message in the prior art, such as an RRC connection reconfiguration message, and this is not restricted in this implementation. The configuration information is carried by extending the IE of the existing RRC message to indicate the group of second pre-configured resources, or the RRC message may be different from the existing RRC messages in the prior art.

Or, for another example, the higher layer signaling may be a Media Access Control (MAC) Control Element (CE) message, and the configuration information may be specifically carried by adding a new MAC CE message to indicate the group of second pre-configured resources.

Or, for another example, the physical layer signaling may be Downlink control information (DCI), and specifically, the configuration information may be carried by the DCI to indicate the group of second pre-configured resources.

Optionally, in a possible implementation mode of this implementation, in 320 and 330, the network device may specifically send third information to the terminal device on a third resource in the first window, and then the network device may send fourth information to the terminal device on a fourth resource.

Msg B may be formed by the third information (such as control information carried on a PDCCH) and the fourth information (such as data carried on a PDSCH).

The third resource is one of a group of third pre-configured resources, for example, a pre-configured resource in a control resource set (CORESET) formed by pre-configured resources appearing periodically. On the CORESET, the third information is transmitted through a Physical Downlink Control CHannel (PDCCH). The third information may be used for indicating a resource location of the fourth resource sending the fourth information, wherein the resource location may include but is not limited to a time domain resource location and/or a frequency domain resource location.

The group of third pre-configured resources may be determined by a protocol or may also be indicated by the network device, and this is not particularly restricted in this implementation.

Specifically, the network device specifically receives at least one piece of the following information to indicate the group of third pre-configured resources:
 a system broadcast message;
 a higher layer signaling; and
 a physical layer signaling.

The information may specifically indicate resource locations of the group of third pre-configured resources, and the resource locations may include, but are not limited to, time domain resource locations and/or frequency domain resource locations.

For example, the existing Master Information Block (MIB) or System Information Block (SIB) in a system broadcast message may be used for carrying configuration information to indicate the group of third pre-configured resources, or a new SIB may be added for carrying configuration information to indicate the group of third pre-configured resources.

Or, for another example, the higher layer signaling may be a radio physical resource control (RRC) message, which may carry configuration information through an Information Element (IE) in the RRC message to indicate the group of third pre-configured resources. The RRC message may be an RRC message in the prior art, such as an RRC connection reconfiguration message, and this is not restricted in this implementation. The configuration information is carried by extending the IE of the existing RRC message to indicate the group of third pre-configured resources, or the RRC message may be different from the existing RRC messages in the prior art.

Or, for another example, the higher layer signaling may be a Media Access Control (MAC) Control Element (CE) message, and the configuration information may be specifically carried by adding a new MAC CE message to indicate the group of third pre-configured resources.

Or, for another example, the physical layer signaling may be Downlink control information (DCI), and specifically, the configuration information may be carried by the DCI to indicate the group of third pre-configured resources.

The fourth information is carried on the fourth resource, and the third information indicates the resource location of the fourth resource, which may include but is not limited to a time domain resource location and/or a frequency domain resource location. The terminal device may specifically detect, on the fourth resource, the fourth information sent by the network device.

In a specific implementation process, the network device may specifically determine a group of third pre-configured resources, and then the network device may select a third pre-configured resource from the group of third pre-configured resources as the third resource.

In the two-step contention-based random access procedure according to the present disclosure, how should timing of detecting Msg B by the terminal device be determined? To solve this problem, considering requirements on the complexity of detection by a terminal device and the flexibility of scheduling at a network side, after the terminal device sends the second information to the network device on the second resource, the terminal device may specifically detect the third information on a group of third pre-configured resources in the first window. Specifically, the terminal device may specifically detect whether there is a third channel scrambled by a third sequence on the group of third pre-configured resources in the first window, as shown in FIG. 2F. The terminal device acquires configuration information of CORESET, wherein the configuration information indicates locations of a group of CORESETs which appear periodically, and the terminal device detects Msg B on this group of CORESETs.

A DCI message in a PDCCH carried in the CORESET indicates a time-frequency resource configuration for data reception by the terminal device and indicates other configuration information.

Optionally, in a possible implementation mode of this implementation, a value of the first time interval in the first window adopted by the network device may be 0, or may also be greater than 0, and this is not particularly restricted in this implementation.

In a specific implementation process, when the value of the first time interval is 0, the start position of the first window may be simplified as, including but not limited to:
 a position after the terminal device sends the second information; or a first time unit after the terminal device sends the second information; or a first time unit with the third pre-configured resource existing after the terminal device sends the second information.

Optionally, in a possible implementation mode of this implementation, in 320, a size of the first window adopted by the network device may be determined by a protocol or may also be indicated by the network device, this is not particularly restricted in this implementation.

Specifically, a sending device may send at least one piece of the following information to indicate the size of the first window:
 a system broadcast message;
 a higher layer signaling; and
 a physical layer signaling.

For example, the existing Master Information Block (MIB) or System Information Block (SIB) in a system broadcast message may be used for carrying indication information to indicate the size of the first window, or a new SIB may be added for carrying indication information to indicate the size of the first window.

Or, for another example, the higher layer signaling may be a radio physical resource control (RRC) message, which may carry indication information through an Information Element (IE) in the RRC message to indicate the size of the first window. The RRC message may be an RRC message in the prior art, such as an RRC connection reconfiguration message, and this is not restricted in this implementation.

The indication information is carried by extending the IE of the existing RRC message to indicate the size of the first window, or the RRC message may be different from the existing RRC messages in the prior art.

Or, for another example, the higher layer signaling may be a Media Access Control (MAC) Control Element (CE) message, and the indication information may be specifically carried by adding a new MAC CE message to indicate the size of the first window.

Or, for another example, the physical layer signaling may be Downlink control information (DCI), and specifically, the indication information may be carried by the DCI to indicate the size of the first window.

In the two-step contention-based random access procedure according to the present disclosure, some special circumstances are considered. For example, the terminal device sends the first information and the second information in Msg A, but the network device only receives part of information of Msg A, such as only the first information of Msg A, but not the second information of MSG A. Then, at this time, it is obviously unnecessary for the terminal device to resend Msg A, the network device can directly send fifth information on a fifth resource based on the received first information. That is to say, the two-step contention-based random access procedure initiated by the terminal device is regressed to the existing four-step contention-based random access procedure.

Optionally, in a possible implementation mode of this implementation, the network device may further send the fifth information on the fifth resource.

In this implementation mode, an execution condition for the network device to send the fifth information on the fifth resource may be that the network device fails to detect the second information, or the execution condition may be determined by the network device according to a preset decision policy, and this is not particularly restricted in this implementation.

The fifth resource is one of a group of fifth pre-configured resources, for example, a pre-configured resource in a control resource set (CORESET) formed by pre-configured resources appearing periodically. On the CORESET, the fifth information, such as a Random Access Response (RAR) message, is transmitted through a Physical Downlink Control CHannel (PDCCH). The fifth information may be used for indicating a resource location of a sixth resource for sending sixth information, wherein the resource location may include but is not limited to a time domain resource location and/or a frequency domain resource location.

The group of fifth pre-configured resources may be determined by a protocol or may also be indicated by the network device, and this is not particularly restricted in this implementation.

Specifically, the network device may send at least one piece of the following information to the terminal device to indicate the group of fifth pre-configured resources:
 a system broadcast message;
 a higher layer signaling; and
 a physical layer signaling.

The information may specifically indicate resource locations of the group of fifth pre-configured resources, and the resource locations may include but are not limited to time domain resource locations and/or frequency domain resource locations.

For example, the existing Master Information Block (MIB) or System Information Block (SIB) in a system broadcast message may be used for carrying configuration information to indicate the group of pre-configured resources, or a new SIB may be added for carrying configuration information to indicate the group of fifth pre-configured resources.

Or, for another example, the higher layer signaling may be a radio physical resource control (RRC) message, which may carry configuration information through an Information Element (IE) in the RRC message to indicate the group of fifth pre-configured resources. The RRC message may be an RRC message in the prior art, such as an RRC connection reconfiguration message, and this is not restricted in this implementation. The configuration information is carried by extending the IE of the existing RRC message to indicate the group of fifth pre-configured resources, or the RRC message may be different from the existing RRC messages in the prior art.

Or, for another example, the higher layer signaling may be a Media Access Control (MAC) Control Element (CE) message, and the configuration information may be specifically carried by adding a new MAC CE message to indicate the group of fifth pre-configured resources.

Or, for another example, the physical layer signaling may be Downlink control information (DCI), and specifically, the configuration information may be carried by the DCI to indicate the group of fifth pre-configured resources.

Specifically, the network device may specifically determine a group of fifth pre-configured resources, and then the network device may select a fifth pre-configured resource from the group of fifth pre-configured resources as the fifth resource.

In a specific implementation process, the network device may specifically send the fifth information on the fifth resource in the first window.

In this implementation process, the terminal device may detect the fifth information on the group of fifth pre-configured resources in the first window. Detailed descriptions may refer to relevant contents in the implementation corresponding to FIG. 2.

In this implementation process, after the network device sends the fifth information on the fifth resource, the network device may receive the sixth information on the sixth resource.

The sixth information is carried on the sixth resource, and the fifth information indicates the resource location of the sixth resource, which may include but is not limited to a time domain resource location and/or a frequency domain resource location. The network device may specifically detect, on the sixth resource, the sixth information sent by the terminal device.

In another specific implementation process, the network device may specifically send the fifth information on the fifth resource in the second window.

A start time of the second window may include but is not limited to:
 a position after a second time interval after the terminal device sends the first information; or
 a first time unit after the second time interval after the terminal device sends the first information; or
 a first time unit with the fifth resource existing after the second time interval after the terminal device sends the first information.

In this implementation process, after the terminal device sends the first information, the network device may activate the second window and send the fifth information to the terminal device on the fifth resource in the second window.

A value of the second time interval in the second window adopted by the network device may be 0, or may also be greater than 0, and this is not particularly restricted in this implementation.

In a specific implementation process, when the value of the second time interval is 0, the start time of the second window may be simplified as, including but not limited to:
- a position after the terminal device sends the first information; or
- a first time unit after the terminal device sends the first information; or
- a first time unit with the fifth resource existing after the terminal device sends the first information.

A size of the second window adopted by the network device may be determined by a protocol or may also be indicated by the network device, and this is not particularly restricted in this implementation.

Specifically, the network device may send at least one piece of the following information to the terminal device to indicate the size of the second window:
- a system broadcast message;
- a higher layer signaling; and
- a physical layer signaling.

For example, the existing Master Information Block (MIB) or System Information Block (SIB) in a system broadcast message may be used for carrying indication information to indicate the size of the second window, or a new SIB may be added for carrying indication information to indicate the size of the second window.

Or, for another example, the higher layer signaling may be a radio physical resource control (RRC) message, which may carry indication information through an Information Element (IE) in the RRC message to indicate the size of the second window. The RRC message may be an RRC message in the prior art, such as an RRC connection reconfiguration message, and this is not restricted in this implementation. The indication information is carried by extending the IE of the existing RRC message to indicate the size of the second window, or the RRC message may be different from the existing RRC messages in the prior art.

Or, for another example, the higher layer signaling may be a Media Access Control (MAC) Control Element (CE) message, and the indication information may be specifically carried by adding a new MAC CE message to indicate the size of the second window.

Or, for another example, the physical layer signaling may be Downlink control information (DCI), and specifically, the indication information may be carried by the DCI to indicate the size of the second window.

In this implementation process, the terminal device may detect the fifth information on the group of fifth pre-configured resources in the second window. Detailed descriptions may refer to relevant contents in the implementation corresponding to FIG. 2.

In this implementation mode, after sending the fifth information to the terminal device on the fifth resource in the second window, the network device may stop performing an operation of detecting the second information on a group of second pre-configured resources, that is, the network device stops continuing detecting the second information on the group of second pre-configured resources.

Optionally, in a possible implementation mode of this implementation, the network device may further send indication information to indicate whether the terminal device is allowed to perform the operation of detecting the fifth information on the group of fifth pre-configured resources.

The network device may specifically send indication information to the terminal device through at least one piece of the following information to indicate the size of the second window:
- a system broadcast message;
- a higher layer signaling; and
- a physical layer signaling.

For example, an existing Master Information Block (MIB) or System Information Block (SIB) in a system broadcast message may be used for indicating whether the terminal device is allowed to perform the operation of detecting the fifth information on the group of fifth pre-configured resources, or a new SIB may be added for carrying indication information to indicate whether the terminal device is allowed to perform the operation of detecting the fifth information on the group of fifth pre-configured resources.

Or, for another example, the higher layer signaling may be a radio physical resource control (RRC) message, which may carry indication information through an Information Element (IE) in the RRC message to indicate whether the terminal device is allowed to perform the operation of detecting the fifth information on the group of fifth pre-configured resources. The RRC message may be an RRC message in the prior art, such as an RRC connection reconfiguration message, and this is not restricted in this implementation. The indication information is carried by extending the IE of the existing RRC message to indicate whether the terminal device is allowed to perform the operation of detecting the fifth information on the group of fifth pre-configured resources, or the RRC message may be different from the existing RRC messages in the prior art.

Or, for another example, the higher layer signaling may be a Media Access Control (MAC) Control Element (CE) message, and the indication information may be specifically carried by adding a new MAC CE message to indicate whether the terminal device is allowed to perform the operation of detecting the fifth information on the group of fifth pre-configured resources.

Or, for another example, the physical layer signaling may be Downlink control information (DCI), and specifically, the indication information may be carried by the DCI to indicate whether the terminal device is allowed to perform the operation of detecting the fifth information on the group of fifth pre-configured resources.

In this implementation mode, the indication information may be further used for instructing the terminal device to perform the operation of detecting the fifth information on the group of fifth pre-configured resources in the first window or to perform the operation of detecting the fifth information on the group of fifth pre-configured resources in the second window.

For example, the indication information may specifically contain information of 1 bit, wherein a value 0 of the bit indicates that the terminal device is instructed to perform the operation of detecting the fifth information on the group of fifth pre-configured resources in the first window, and a value 1 of the bit indicates that the terminal device is instructed to perform the operation of detecting the fifth information on the group of fifth pre-configured resources in the second window, or vice versa, the value 1 of the bit indicates that the terminal device is instructed to perform the operation of detecting the fifth information on the group of fifth pre-configured resources in the first window, and the value 0 of the bit indicates that the terminal device is instructed to perform the operation of detecting the fifth information on the group of fifth pre-configured resources in the second window.

The present disclosure provides a solution for detecting Msg B in a two-step contention-based random access procedure, and considering the situation that the two-step contention-based random access procedure is regressed to the four-step contention-based random access procedure, a detection solution design is proposed, in which reception of Msg B in the two-step random access procedure and reception of Msg 2 in the four-step random access procedure are both taken into account, a correlation between the two kinds of detections is analyzed and processed, thus unnecessary redundant operations of sending and detection in the two-step random access procedure are avoided, the performance of the two-step contention-based random access is improved, and the delay overhead of the random access is further reduced.

In this implementation, the network device detects the first information on the group of first pre-configured resources and detects the second information on the group of second pre-configured resources, so that the network device can send the third information on the third resource and send the fourth information on the fourth resource in the first window. In this way, in a complete random access procedure, information interaction needs to be performed only once between the terminal device and the network device, which can effectively reduce the delay overhead of the random access, thus the random access of the terminal device in a low-latency scenario is achieved.

It should be noted that for sake of conciseness, above method implementations are all expressed as a combination of a series of acts. But one skilled person in the art should know that the present disclosure is not limited by the sequence of acts described, since some acts may be performed with other sequences or simultaneously according to the present disclosure. Secondly, one skilled person in the art should also know that the implementations described in the specification are all preferred implementations, and the acts and modules involved are not necessary to the present disclosure.

In the above implementations, the description of each implementation has its own emphasis. A part which is not described in detail in an implementation may be referred to related descriptions in other implementations.

FIG. 4 is a schematic block diagram of a terminal device 400 according to an implementation of the present disclosure. The terminal device 400 according to this implementation may include a sending unit 410 and a receiving unit 420.

The sending unit 410 is configured to send first information on a first resource and send second information on a second resource.

The receiving unit 420 is configured to detect third information on a group of third pre-configured resources in a first window; wherein a start position of the first window includes:
  a position after a first time interval after a terminal device sends the second information; or
  a first time unit after the first time interval after the terminal device sends the second information; or
  a first time unit with the third pre-configured resource existing after the first time interval after the terminal device sends the second information.

The receiving unit 420 is further configured to receive fourth information on a fourth resource.

Optionally, in a possible implementation mode of this implementation, the sending unit 410 is specifically configured to determine a group of first pre-configured resources, and select a first pre-configured resource from the group of first pre-configured resources as the first resource.

The group of first pre-configured resources is determined by a protocol or indicated by the network device.

For example, the receiving unit 420 is specifically configured to receive at least one piece of the following information to indicate the group of first pre-configured resources:
  a system broadcast message;
  a higher layer signaling; and
  a physical layer signaling.

Optionally, in a possible implementation mode of this implementation, the sending unit 410 is specifically configured to determine a group of second pre-configured resources, and select a second pre-configured resource from the group of second pre-configured resources as the second resource.

The group of second pre-configured resources is determined by a protocol or indicated by the network device.

For example, the receiving unit 420 is specifically configured to receive at least one piece of the following information to indicate the group of second pre-configured resources:
  a system broadcast message;
  a higher layer signaling; and
  a physical layer signaling.

Optionally, in a possible implementation mode of this implementation, a value of the first time interval is greater than or equal to 0.

Optionally, in a possible implementation mode of this implementation, a size of the first window is determined by a protocol or indicated by the network device.

Optionally, in a possible implementation mode of this implementation, the receiving unit 420 is specifically configured to receive at least one piece of the following information to indicate the size of the first window:
  a system broadcast message;
  a higher layer signaling; and
  a physical layer signaling.

The group of third pre-configured resources is determined by a protocol or indicated by the network device.

For example, the receiving unit 420 is specifically configured to receive at least one piece of the following information to indicate the group of third pre-configured resources:
  a system broadcast message;
  a higher layer signaling; and
  a physical layer signaling.

Optionally, in a possible implementation mode of this implementation, the receiving unit 420 is further configured to detect fifth information on a group of fifth pre-configured resources.

The group of fifth pre-configured resources is determined by a protocol or indicated by the network device.

For example, the receiving unit 420 is specifically configured to receive at least one piece of the following information to indicate the group of fifth pre-configured resources:
  a system broadcast message;
  a higher layer signaling; and
  a physical layer signaling.

In a specific implementation process, the receiving unit 420 is specifically configured to detect the fifth information on the group of fifth pre-configured resources in the first window.

Specifically, the receiving unit 420 may be configured to stop detecting the fifth information on the group of fifth pre-configured resources in the first window if the third information is detected; stop detecting the third information on the group of third pre-configured resources in the first window if the fifth information is detected; and the sending unit 410 is configured to send sixth information on a sixth resource.

In another specific implementation process, the receiving unit 420 may be specifically configured to detect the fifth information on the group of fifth pre-configured resources in a second window. A start time of the second window includes:

- a position after a second time interval after the terminal device sends the first information; or
- a first time unit after the second time interval after the terminal device sends the first information; or
- a first time unit with the fifth pre-configured resource existing after the second time interval after the terminal device sends the first information.

A value of the second time interval is greater than or equal to 0.

A size of the second window is determined by a protocol or indicated by the network device.

For example, the receiving unit 420 may be specifically configured to receive at least one piece of the following information to indicate the size of the second window:

- a system broadcast message;
- a higher layer signaling; and
- a physical layer signaling.

Specifically, the receiving unit 420 may be configured to stop detecting the fifth information on the group of fifth pre-configured resources in the second window if the third information is detected; not perform an operation of sending the second information on the second resource or stop detecting the third information on the group of third pre-configured resources in the first window if the fifth information is detected; and the sending unit 410 is configured to send the sixth information on the sixth resource.

Optionally, in a possible implementation mode of this implementation, the receiving unit 420 is specifically configured to receive indication information to indicate whether the operation of detecting the fifth information on the group of fifth pre-configured resources is allowed.

It should be noted that the method performed by the terminal device in the implementation corresponding to FIG. 2A may be used for realizing the corresponding functions implemented by the terminal device in the above methods. Detailed descriptions may refer to relevant contents in the implementation corresponding to FIG. 2A, which will not be repeated here.

In this implementation, the sending unit sends the first information on the first resource and sends the second information on the second resource, and then the receiving unit detects the third information on the group of third pre-configured resources in the first window, so that the receiving unit can receive the fourth information on the fourth resource. In this way, in a complete random access procedure, information interaction needs to be performed only once between the terminal device and the network device, which can effectively reduce the delay overhead of the random access, thus the random access of the terminal device in a low-latency scenario is achieved.

Figure 5:
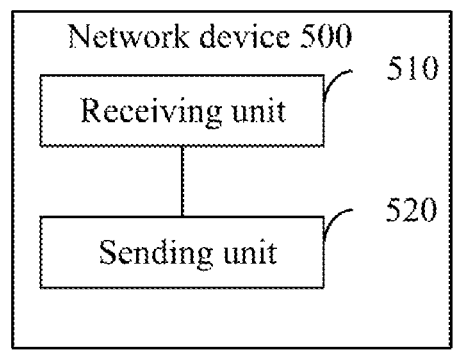
FIG. 5 is a schematic block diagram of a network device according to an implementation of the present disclosure.

FIG. 5 is a schematic block diagram of a network device 500 according to an implementation of the present disclosure. The network device 500 according to this implementation may include a receiving unit 510 and a sending unit 520.

The receiving unit 510 is configured to detect first information on a group of first pre-configured resources and detect second information on a group of second pre-configured resources.

The sending unit 520 is configured to send third information on a group of third pre-configured resources in a first window; wherein a start position of the first window includes:

- a position after a first time interval after a terminal device sends the second information; or
- a first time unit after the first time interval after the terminal device sends the second information; or
- a first time unit with the third pre-configured resource existing after the first time interval after the terminal device sends the second information.

The sending unit 520 is further configured to send fourth information on a fourth resource.

Optionally, in a possible implementation mode of this implementation, the group of first pre-configured resources is determined by a protocol or indicated by the network device.

Further, the sending unit 520 is further configured to send at least one piece of the following information to indicate the group of first pre-configured resources:

- a system broadcast message;
- a higher layer signaling; and
- a physical layer signaling.

Optionally, in a possible implementation mode of this implementation, the group of second pre-configured resources is determined by a protocol or indicated by the network device.

Further, the sending unit 520 is further configured to send at least one piece of the following information to indicate the group of second pre-configured resources:

- a system broadcast message;
- a higher layer signaling; and
- a physical layer signaling.

Optionally, in a possible implementation mode of this implementation, a value of the first time interval is greater than or equal to 0.

Optionally, in a possible implementation mode of this implementation, a size of the first window is determined by a protocol or indicated by the network device.

Optionally, in a possible implementation mode of this implementation, the sending unit 520 is specifically configured to send at least one piece of the following information to indicate the size of the first window:

- a system broadcast message;
- a higher layer signaling; and
- a physical layer signaling.

Optionally, in a possible implementation mode of this implementation, the sending unit 520 is specifically configured to determine a group of third pre-configured resources, and select a third pre-configured resource from the group of third pre-configured resources as the third resource.

The group of third pre-configured resources is determined by a protocol or indicated by the network device.

For example, the sending unit 520 is specifically configured to send at least one piece of the following information to indicate the group of third pre-configured resources:

a system broadcast message;
a higher layer signaling; and
a physical layer signaling.

Optionally, in a possible implementation mode of this implementation, the sending unit 520 is further configured to send fifth information on a fifth resource.

Specifically, the sending unit 520 is specifically configured to determine a group of fifth pre-configured resources, select a fifth pre-configured resource from the group of fifth pre-configured resources as the fifth resource.

The group of fifth pre-configured resources is determined by a protocol or indicated by the network device.

For example, the sending unit 520 is specifically configured to send at least one piece of the following information to indicate the group of fifth pre-configured resources:
a system broadcast message;
a higher layer signaling; and
a physical layer signaling.

In a specific implementation process, the sending unit 520 is specifically configured to send the fifth information on the fifth resource in the first window.

Further, the receiving unit 510 is further configured to receive sixth information on a sixth resource.

In another specific implementation process, the sending unit 520 is specifically configured to send the fifth information on the fifth resource in a second window. A start time of the second window includes:
a position after a second time interval after the terminal device sends the first information; or
a first time unit after the second time interval after the terminal device sends the first information; or
a first time unit with the fifth resource existing after the second time interval after the terminal device sends the first information.

A value of the second time interval is greater than or equal to 0.

A size of the second window is determined by a protocol or indicated by the network device.

For example, the sending unit 520 is specifically configured to send at least one piece of the following information to indicate the size of the second window:
a system broadcast message;
a higher layer signaling; and
a physical layer signaling.

Further, the receiving unit 510 is further configured to stop the operation of detecting the second information on the group of second pre-configured resources.

Optionally, in a possible implementation mode of this implementation, the sending unit 520 is specifically configured to send indication information to indicate whether the terminal device is allowed to perform the operation of detecting the fifth information on a group of fifth pre-configured resources.

It should be noted that the method performed by the network device in the implementation corresponding to FIG. 3 may be used for realizing the corresponding functions implemented by the network device in the above methods. Detailed descriptions may refer to relevant contents in the implementation corresponding to FIG. 3, which will not be repeated here.

In this implementation, the receiving unit detects the first information on the group of first pre-configured resources and detects the second information on the group of second pre-configured resources, so that the sending unit can send the third information on the third resource and send the fourth information on the fourth resource in the first window. In this way, in a complete random access procedure, information interaction needs to be performed only once between the terminal device and the network device, which can effectively reduce the delay overhead of the random access, thus the random access of the terminal device in a low-latency scenario is achieved.

Figure 6:
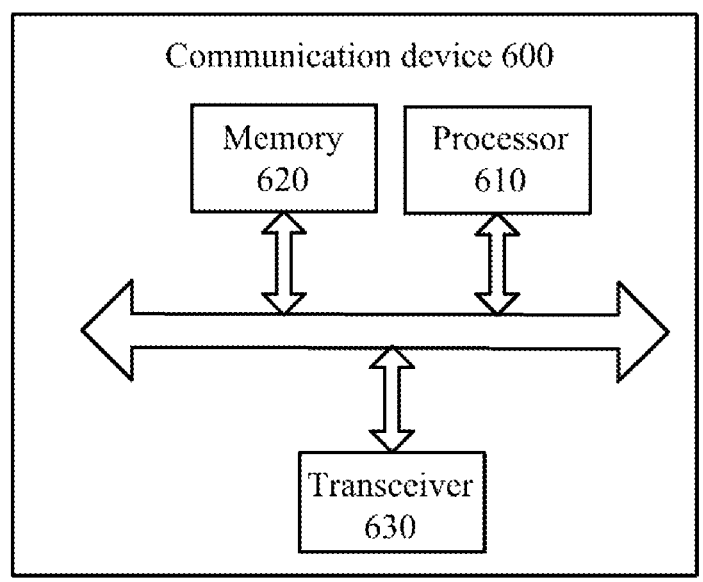
FIG. 6 is a schematic block diagram of a communication device according to an implementation of the present disclosure.

FIG. 6 is a schematic diagram of a structure of a communication device 600 according to an implementation of the present disclosure. The communication device 600 shown in FIG. 4 includes a processor 610. The processor 610 may call and run a computer program from a memory to implement a method in an implementation of the present disclosure.

Optionally, as shown in FIG. 4, the communication device 600 may further include a memory 620. The processor 610 may call and run a computer program from the memory 620 to implement the method in an implementation of the present disclosure.

The memory 620 may be a separate device independent of the processor 610 or may be integrated in the processor 610.

It should be understood that, the processor in an implementation of the present disclosure may be an integrated circuit chip having a signal processing capability. In an implementation process, the acts of the foregoing method implementations may be implemented by using an integrated logic circuit of hardware in the processor or instructions in a form of software. The above processor may be a general purpose processor, a Digital Signal Processor (DSP), an Application Specific Integrated Circuit (ASIC), a Field Programmable Gate Array (FPGA) or another programmable logic device, a discrete gate or a transistor logic device, or a discrete hardware component. The processor may implement or perform methods, acts and logical block diagrams disclosed in an implementation of the present disclosure. The general purpose processor may be a microprocessor, or the processor may also be any conventional processor or the like. The acts of the method disclosed with reference to an implementation of the present disclosure may be directly implemented by a hardware decoding processor, or may be implemented by a combination of hardware and software modules in the decoding processor. The software modules may be located in a memory medium commonly used in the art, such as a random access memory, a flash memory, a read-only memory, a programmable read-only memory or an electrically erasable programmable memory, or a register. The storage medium is located in the memory, and the processor reads the information in the memory and completes the acts of the above method in combination with its hardware.

It may be understood that, the memory in an implementation of the present disclosure may be a volatile memory or a non-volatile memory, or may include both a volatile memory and a non-volatile memory. The non-volatile memory may be a Read-Only Memory (ROM), a Programmable ROM (PROM), an Erasable PROM (EPROM), an Electrically EPROM (EEPROM), or a flash memory. The volatile memory may be a random access memory (Random Access Memory, RAM), which is used as an external cache. As an illustrative but not limitative description, many forms of RAMs may be used, for example, a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM), and a Direct Rambus RAM (DRRAM). It should be noted that the memories in the systems and methods described in this specification are intended to include, but are not limited to, these and any memory of another proper type.

It should be understood that, the foregoing memory is illustrative but not limitative description. For example, a memory in the implementations of the present disclosure may also be a Static RAM (SRAM), a Dynamic RAM (DRAM), a Synchronous DRAM (SDRAM), a double data rate SDRAM (DDR SDRAM), an enhanced SDRAM (ESDRAM), or a synchlink DRAM (SLDRAM), a Direct Rambus RAM (DR RAM), or the like. That is, memories in the implementations of the present disclosure are intended to include, but are not limited to, these memories and any memory of another proper type.

Optionally, as shown in FIG. 6, the communication device 600 may further include a transceiver 630, and the processor 610 may control the transceiver 630 to communicate with another device. Specifically, the transceiver may send information or data to another device or receive information or data sent by another device.

The transceiver 630 may include a transmitter and a receiver. The transceiver 630 may further include antennas, and the number of the antennas may be one or more.

Optionally, the communication device 600 may specifically be a network device of an implementation of the present disclosure, and the communication device 600 may implement the corresponding processes implemented by the network device in various methods of the implementations of the present disclosure, which will not be repeated here for brevity.

Optionally, the communication device 600 may specifically be a mobile terminal/terminal device of an implementation of the present disclosure, and the communication device 600 may implement the corresponding processes implemented by the mobile terminal/terminal device in various methods of the implementations of the present disclosure, which will not be repeated here for brevity.

Figure 7:
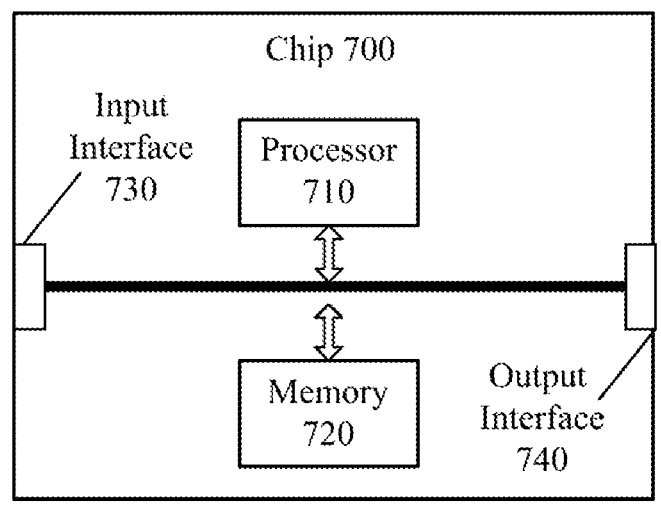
FIG. 7 is a schematic block diagram of a chip according to an implementation of the present disclosure.

FIG. 7 is a schematic diagram of structure of a chip according to an implementation of the present disclosure. The chip 700 shown in FIG. 7 includes a processor 710. The processor 710 may call and run a computer program from a memory to implement a method in an implementation of the present disclosure.

Optionally, as shown in FIG. 5, the chip 700 may further include a memory 720. The processor 710 may call and run a computer program from the memory 720 to implement a method in an implementation of the present disclosure.

The memory 720 may be a separate device independent of the processor 710 or may be integrated in the processor 710.

It should be understood that, the processor in an implementation of the present disclosure may be an integrated circuit chip having a signal processing capability. In an implementation process, the acts of the foregoing method implementations may be implemented by using an integrated logic circuit of hardware in the processor or instructions in a form of software. The above processor may be a general purpose processor, a Digital Signal Processor (DSP), an Application Specific Integrated Circuit (ASIC), a Field Programmable Gate Array (FPGA) or another programmable logic device, a discrete gate or a transistor logic device, or a discrete hardware component. The processor may implement or perform methods, acts and logical block diagrams disclosed in an implementation of the present disclosure. The general purpose processor may be a microprocessor, or the processor may also be any conventional processor or the like. The acts of the method disclosed with reference to an implementation of the present disclosure may be directly implemented by a hardware decoding processor, or may be implemented by a combination of hardware and software modules in the decoding processor. The software modules may be located in a memory medium commonly used in the art, such as a random access memory, a flash memory, a read-only memory, a programmable read-only memory or an electrically erasable programmable memory, or a register. The storage medium is located in the memory, and the processor reads the information in the memory and completes the acts of the above method in combination with its hardware.

It may be understood that, the memory in an implementation of the present disclosure may be a volatile memory or a non-volatile memory, or may include both a volatile memory and a non-volatile memory. The non-volatile memory may be a Read-Only Memory (ROM), a Programmable ROM (PROM), an Erasable PROM (EPROM), an Electrically EPROM (EEPROM), or a flash memory. The volatile memory may be a random access memory (RAM) which serves as an external cache. As an illustrative but not limitative description, many forms of RAMs may be used, for example, a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM), and a Direct Rambus RAM (DRRAM). It should be noted that memories in the systems and methods described in this specification are intended to include, but are not limited to, these memories and any memory of another proper type.

It should be understood that, the foregoing memory is illustrative but not limitative description. For example, the memory in the implementations of the present disclosure may also be a Static RAM (SRAM), a Dynamic RAM (DRAM), a Synchronous DRAM (SDRAM), a double data rate SDRAM (DDR SDRAM), an enhanced SDRAM (ESDRAM), or a synchlink DRAM (SLDRAM), a Direct Rambus RAM (DR RAM), or the like. That is, memories in implementations of the present disclosure are intended to include, but are not limited to, these and any other suitable types of memories.

Optionally, the chip 700 may further include an input interface 730. The processor 710 may control the input interface 730 to communicate with another device or chip. Specifically, the processor may acquire information or data sent by another device or chip.

Optionally, the chip 700 may further include an output interface 740. The processor 710 may control the output interface 740 to communicate with another device or chip. Specifically, the processor may output information or data to another device or chip.

Optionally, the chip may be applied to a network device in an implementation of the present disclosure, and the chip may implement the corresponding processes implemented by the network device in various methods of the implementations of the present disclosure, which will not be repeated here for brevity.

Optionally, the chip may be applied to a mobile terminal/terminal device in an implementation of the present disclosure, and the chip may implement the corresponding processes implemented by the mobile terminal/terminal device in various methods of the implementations of the present disclosure, which will not be repeated here for brevity.

It should be understood that the chip mentioned in the implementation of the present disclosure may also be referred to as a system-level chip, a system chip, a chip system or a system chip-on-chip, etc.

Figure 8:
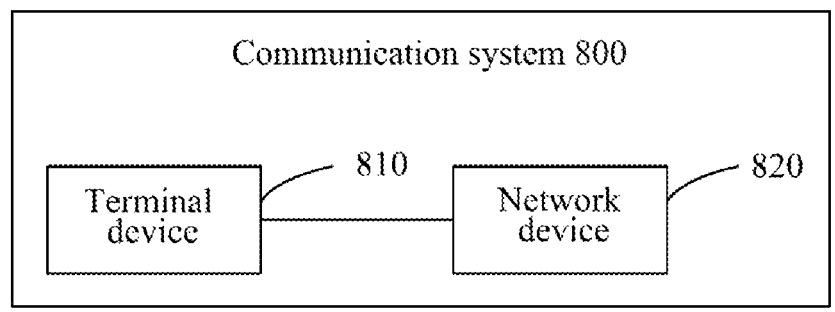
FIG. 8 is a schematic block diagram of a communication system according to an implementation of the present disclosure.

FIG. 8 is a schematic block diagram of a communication system 800 according to an implementation of the present disclosure. As shown in FIG. 8, the communication system 800 includes a terminal device 810 and a network device 820.

The terminal device 810 may be configured to implement the corresponding functions implemented by the terminal device in the above-mentioned methods, and the network device 820 may be configured to implement the corresponding functions implemented by the network device in the above-mentioned methods, which will not be repeated here for brevity.

An implementation of the present disclosure further provides a computer readable storage medium, configured to store a computer program.

Optionally, the computer readable storage medium may be applied to a terminal device in an implementation of the present disclosure, and the computer program enables a computer to perform the corresponding processes implemented by the terminal device in various methods of the implementations of the present disclosure, which will not be repeated here for brevity.

An implementation of the present disclosure further provides a computer program product including computer program instructions.

Optionally, the computer program product may be applied to a terminal device in an implementation of the present disclosure, and the computer program instructions enable a computer to perform the corresponding processes implemented by the terminal device in various methods of the implementations of the present disclosure, which will not be repeated here for brevity.

An implementation of the present disclosure further provides a computer program.

Optionally, the computer program may be applied to a terminal device in an implementation of the present disclosure. When the computer program is run on a computer, the computer is enabled to perform the corresponding processes implemented by the terminal device in various methods of the implementations of the present disclosure, which will not be repeated here for brevity.

Those of ordinary skill in the art will recognize that the example units and algorithm acts described in combination with the implementations disclosed herein can be implemented in electronic hardware, or a combination of computer software and electronic hardware. Whether these functions are implemented in hardware or software depends on the specific application and design constraints of the technical solution. Those skilled in the art may use different methods to implement the described functions in respect to each particular application, but such implementation should not be considered to be beyond the scope of the present disclosure.

Those skilled in the art may clearly learn that for convenience and conciseness of description, the specific working processes of systems, apparatuses and units described above may refer to the corresponding processes in the method implementations, and this will not be repeated here.

In several implementations provided by the present disclosure, it should be understood that the disclosed systems, apparatuses and methods may be implemented in other ways. For example, the apparatus implementations described above are only illustrative, for example, the division of the units is only a logical function division, and there may be another division manner in an actual implementation, for example, multiple units or components may be combined or integrated into another system, or some features may be ignored or not executed. On the other hand, the mutual coupling or direct coupling or communication connection shown or discussed may be indirect coupling or communication connection of apparatuses or units through some interfaces, and may be in electrical, mechanical or other forms.

The unit described as a separate component may or may not be physically separated, and the component shown as a unit may or may not be a physical unit, i.e., it may be located in one place or may be distributed over multiple network units. Part or all of the units therein may be selected according to an actual need to achieve the purpose of the solution of the present implementation.

In addition, various functional units in various implementations of the present disclosure may be integrated in one processing unit, or the various units may be physically present separately, or two or more units may be integrated in one unit.

The functions may be stored in a computer readable storage medium, if realized in a form of software functional units and sold or used as a separate product. Based on this understanding, the technical solution of the present disclosure, in essence, or the part contributing to the prior art, or the part of the technical solution, may be embodied in the form of a software product, wherein the computer software product is stored in a storage medium and includes a number of instructions for causing a computer device (which may be a personal computer, a server, or a network device, or the like) to perform all or part of the acts of the method described in various implementations of the present disclosure. The aforementioned storage medium includes various media, such as a U disk, a mobile hard disk, a read-only memory (ROM), a random access memory (RAM), a magnetic disk, or an optical disk, which are capable of storing program codes.

What are described above are merely example implementations of the present disclosure, but the protection scope of the present disclosure is not limited thereto. Any variation or substitution that may be easily conceived by a person skilled in the art within the technical scope disclosed by the present disclosure shall be included within the protection scope of the present disclosure. Therefore, the protection scope of the present disclosure shall be determined by the protection scope of the claims.

What is claimed is:

1. A terminal device, comprising: a processor and a transceiver, wherein
   the transceiver is configured to send first information on a first resource and send second information on a second resource;
   the processor is configured to detect third information on a group of third pre-configured resources in a first window, wherein a start position of the first window comprises:
   a position after a first time interval after the terminal device sends the second information; or
   a first time unit after the first time interval after the terminal device sends the second information; or
   a first time unit with the third pre-configured resource existing after the first time interval after the terminal device sends the second information; and
   the transceiver is further configured to receive fourth information on a fourth resource.

2. The terminal device of claim 1, wherein a value of the first time interval is greater than or equal to 0.

3. The terminal device of claim 1, wherein a size of the first window is determined by a protocol or indicated by a network device.

4. The terminal device of claim 1, wherein the transceiver is configured to:
receive at least one piece of following information to indicate a size of the first window:
a system broadcast message;
a higher layer signaling; and
a physical layer signaling.

5. The terminal device of claim 1, wherein the processor is configured to:
determine a group of first pre-configured resources; and
select a first pre-configured resource from the group of first pre-configured resources as the first resource.

6. The terminal device of claim 5, wherein the group of first pre-configured resources is determined by a protocol or indicated by a network device.

7. The terminal device of claim 5, wherein the transceiver is configured to:
receive at least one piece of following information to indicate the group of first pre-configured resources:
a system broadcast message;
a higher layer signaling; and
a physical layer signaling.

8. The terminal device of claim 1, wherein the processor is configured to:
determine a group of second pre-configured resources; and
select a second pre-configured resource from the group of second pre-configured resources as the second resource.

9. The terminal device of claim 8, wherein the group of second pre-configured resources is determined by a protocol or indicated by a network device.

10. The terminal device of claim 8, wherein the transceiver is configured to:
receive at least one piece of following information to indicate the group of second pre-configured resources:
a system broadcast message;
a higher layer signaling; and
a physical layer signaling.

11. The terminal device of claim 1, wherein the group of third pre-configured resources is determined by a protocol or indicated by a network device.

12. The terminal device of claim 1, wherein the transceiver is configured to:
receive at least one piece of following information to indicate the group of third pre-configured resources:
a system broadcast message;
a higher layer signaling; and
a physical layer signaling.

13. The terminal device of claim 1, wherein the processor is further configured to:
detect fifth information on a group of fifth pre-configured resources, wherein the group of fifth pre-configured resources is determined by a protocol or indicated by a network device,
the transceiver is configured to:
receive at least one piece of following information to indicate the group of fifth pre-configured resources:
a system broadcast message;
a higher layer signaling; and
a physical layer signaling.

14. The terminal device of claim 13, wherein the processor is configured to:
detect the fifth information on the group of fifth pre-configured resources in the first window,
stop detecting the fifth information on the group of fifth pre-configured resources in the first window if the third information is detected;
stop detecting the third information on the group of third pre-configured resources in the first window if the fifth information is detected,
and the transceiver is configured to send sixth information on a sixth resource.

15. The terminal device of claim 13, wherein the processor is configured to:
detect the fifth information on the group of fifth pre-configured resources in a second window, wherein a start time of the second window comprises:
a position after a second time interval after the terminal device sends the first information; or
a first time unit after the second time interval after the terminal device sends the first information; or
a first time unit with the fifth pre-configured resource existing after the second time interval after the terminal device sends the first information,
wherein a value of the second time interval is greater than or equal to 0,
wherein a size of the second window is determined by a protocol or indicated by a network device.

16. The terminal device of claim 15, wherein the transceiver is configured to:
receive at least one piece of following information to indicate a size of the second window:
a system broadcast message;
a higher layer signaling; and
a physical layer signaling.

17. The terminal device of claim 15, wherein the processor is configured to:
stop detecting the fifth information on the group of fifth pre-configured resources in the second window if the third information is detected;
not perform an operation of sending the second information on the second resource, or stop detecting the third information on the group of third pre-configured resources in the first window if the fifth information is detected,
and the transceiver is configured to send sixth information on a sixth resource.

18. The terminal device of claim 13, wherein the transceiver is configured to:
receive indication information to indicate whether an operation of detecting the fifth information on the group of fifth pre-configured resources is allowed.

19. A network device, comprising: a processor and a transceiver, wherein
the processor is configured to detect first information on a group of first pre-configured resources and detect second information on a group of second pre-configured resources; and
the transceiver is configured to send third information on a group of third re-configured resources in a first window, wherein a start position of the first window comprises:
a position after a first time interval after a terminal device sends the second information; or
a first time unit after the first time interval after the terminal device sends the second information; or
a first time unit with the third pre-configured resource existing after the first time interval after the terminal device sends the second information; and
the transceiver is further configured to send fourth information on a fourth resource.

20. A method for random access, comprising:
sending, by a terminal device, first information on a first resource and sending second information on a second resource;
detecting, by the terminal device, third information on a group of third pre-configured resources in a first window; wherein a start position of the first window comprises:
a position after a first time interval after the terminal device sends the second information; or
a first time unit after the first time interval after the terminal device sends the second information; or
a first time unit with the third pre-configured resource existing after the first time interval after the terminal device sends the second information; and
receiving, by the terminal device, fourth information on a fourth resource.

* * * * *